United States Patent
Guest et al.

(10) Patent No.: US 9,707,739 B2
(45) Date of Patent: *Jul. 18, 2017

(54) INTERMETALLIC METALLIC COMPOSITE, METHOD OF MANUFACTURE THEREOF AND ARTICLES COMPRISING THE SAME

(75) Inventors: Randall V. Guest, Spring, TX (US); Michael H. Johnson, Katy, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 836 days.

This patent is subject to a terminal disclaimer.

(21) Appl. No.: 13/189,150

(22) Filed: Jul. 22, 2011

(65) Prior Publication Data

US 2013/0022832 A1 Jan. 24, 2013

(51) Int. Cl.
*B32B 15/01* (2006.01)
*E21B 33/12* (2006.01)
*B32B 15/18* (2006.01)

(52) U.S. Cl.
CPC ............ *B32B 15/017* (2013.01); *B32B 15/01* (2013.01); *B32B 15/18* (2013.01); *E21B 33/1208* (2013.01); *Y10T 428/12458* (2015.01); *Y10T 428/12493* (2015.01); *Y10T 428/12729* (2015.01); *Y10T 428/12736* (2015.01); *Y10T 428/12792* (2015.01); *Y10T 428/12903* (2015.01); *Y10T 428/12931* (2015.01)

(58) Field of Classification Search
CPC ........................................ B32B 15/01–15/017
USPC ................. 428/649–653, 655–656, 144, 403
See application file for complete search history.

(56) References Cited

U.S. PATENT DOCUMENTS

| | | | |
|---|---|---|---|
| 1,468,905 A * | 9/1923 | Herman | ........................ 428/610 |
| 1,558,066 A | 10/1925 | Veazey et al. | |
| 1,880,614 A | 10/1932 | Wetherill | |
| 2,011,613 A | 8/1935 | Brown et al. | |

(Continued)

FOREIGN PATENT DOCUMENTS

| | | |
|---|---|---|
| CA | 2783346 A1 | 6/2011 |
| CN | 2658384 Y | 11/2004 |

(Continued)

OTHER PUBLICATIONS

International Search Report for Application No. PCT/US2012/044229, International Filing Date Jun. 26, 2012; Issued Jan. 30, 2013. (3 pages).

(Continued)

*Primary Examiner* — Humera Sheikh
*Assistant Examiner* — Lucas Wang
(74) *Attorney, Agent, or Firm* — Cantor Colburn LLP

(57) ABSTRACT

Disclosed herein is an article comprising a plurality of domains fused together; wherein the domains comprise a core comprising a first metal; and a first layer disposed upon the core; the first layer comprising a second metal; the first metal being chemically different the second metal. Disclosed herein too is a method comprising rolling a sheet in a roll mill; the sheet comprising a first metal and having disposed upon each opposing face of the sheet a first layer that comprises a second metal; the second metal being chemically different from the first metal; cutting the sheet into a plurality of sheets; stacking the plurality of sheets; and rolling the stacked sheets in the roll mill to form a blank.

17 Claims, 2 Drawing Sheets

(56) References Cited

U.S. PATENT DOCUMENTS

| | | |
|---|---|---|
| 2,094,578 A | 10/1937 | Blumenthal et al. |
| 2,189,697 A | 2/1940 | Baker |
| 2,222,233 A | 11/1940 | Mize |
| 2,225,143 A | 12/1940 | Baker et al. |
| 2,238,895 A | 4/1941 | Gage |
| 2,261,292 A | 11/1941 | Salnikov |
| 2,294,648 A | 9/1942 | Ansel et al. |
| 2,301,624 A | 11/1942 | Holt |
| 2,352,993 A | 7/1944 | Albertson |
| 2,394,843 A | 2/1946 | Cooke et al. |
| 2,672,199 A | 3/1954 | McKenna |
| 2,753,941 A | 7/1956 | Hebard et al. |
| 2,754,910 A | 7/1956 | Derrick et al. |
| 2,933,136 A | 4/1960 | Ayers et al. |
| 2,983,634 A | 5/1961 | Budininkas et al. |
| 3,057,405 A | 10/1962 | Mallinger |
| 3,066,391 A | 12/1962 | Vordahl |
| 3,106,959 A | 10/1963 | Huitt et al. |
| 3,142,338 A | 7/1964 | Brown |
| 3,152,009 A | 10/1964 | DeLong |
| 3,180,728 A | 4/1965 | Keir et al. |
| 3,180,778 A | 4/1965 | Stilli et al. |
| 3,196,949 A | 7/1965 | Thomas |
| 3,226,314 A | 12/1965 | Wellington et al. |
| 3,242,988 A | 3/1966 | McGuire et al. |
| 3,295,935 A | 1/1967 | Pflumm et al. |
| 3,316,748 A | 5/1967 | Lang et al. |
| 3,326,291 A | 6/1967 | Zandmer et al. |
| 3,347,317 A | 10/1967 | Zandemer |
| 3,347,714 A | 10/1967 | Broverman et al. |
| 3,390,724 A | 7/1968 | Caldwell |
| 3,395,758 A | 8/1968 | Kelly et al. |
| 3,406,101 A | 10/1968 | Kilpatrick |
| 3,416,918 A | 12/1968 | Henry |
| 3,434,537 A | 3/1969 | Zandmer |
| 3,465,181 A | 9/1969 | Colby et al. |
| 3,489,218 A | 1/1970 | Means |
| 3,513,230 A | 5/1970 | Rhees et al. |
| 3,600,163 A | 8/1971 | Badia et al. |
| 3,602,305 A | 8/1971 | Kisling |
| 3,637,446 A | 1/1972 | Elliott et al. |
| 3,645,331 A | 2/1972 | Maurer et al. |
| 3,660,049 A | 5/1972 | Benjamin |
| 3,765,484 A | 10/1973 | Hamby, Jr. et al. |
| 3,768,563 A | 10/1973 | Blount |
| 3,775,823 A | 12/1973 | Adolph et al. |
| 3,816,080 A | 6/1974 | Bomford et al. |
| 3,823,045 A | 7/1974 | Hielema |
| 3,878,889 A | 4/1975 | Seabourn |
| 3,894,850 A | 7/1975 | Kovalchuk et al. |
| 3,924,677 A | 12/1975 | Prenner et al. |
| 3,957,483 A | 5/1976 | Suzuki |
| 4,010,583 A | 3/1977 | Highberg |
| 4,039,717 A | 8/1977 | Titus |
| 4,050,529 A | 9/1977 | Tagirov et al. |
| 4,157,732 A | 6/1979 | Fonner |
| 4,248,307 A | 2/1981 | Silberman et al. |
| 4,284,137 A | 8/1981 | Taylor |
| 4,292,377 A | 9/1981 | Petersen et al. |
| 4,372,384 A | 2/1983 | Kinney |
| 4,373,584 A | 2/1983 | Silberman et al. |
| 4,373,952 A | 2/1983 | Parent |
| 4,374,543 A | 2/1983 | Richardson |
| 4,384,616 A | 5/1983 | Dellinger |
| 4,395,440 A | 7/1983 | Abe et al. |
| 4,399,871 A | 8/1983 | Adkins et al. |
| 4,407,368 A | 10/1983 | Erbstoesser |
| 4,422,508 A | 12/1983 | Rutledge, Jr. et al. |
| 4,450,136 A | 5/1984 | Dudek et al. |
| 4,452,311 A | 6/1984 | Speegle et al. |
| 4,475,729 A | 10/1984 | Costigan |
| 4,498,543 A | 2/1985 | Pye et al. |
| 4,499,048 A | 2/1985 | Hanejko |
| 4,499,049 A | 2/1985 | Hanejko |
| 4,524,825 A | 6/1985 | Fore |
| 4,526,840 A | 7/1985 | Jarabek |
| 4,534,414 A | 8/1985 | Pringle |
| 4,539,175 A | 9/1985 | Lichti et al. |
| 4,554,986 A | 11/1985 | Jones |
| 4,619,699 A | 10/1986 | Petkovic-Luton et al. |
| 4,640,354 A | 2/1987 | Boisson |
| 4,648,901 A | 3/1987 | Murray et al. |
| 4,664,962 A | 5/1987 | DesMarais, Jr. |
| 4,668,470 A | 5/1987 | Gilman et al. |
| 4,673,549 A | 6/1987 | Ecer |
| 4,674,572 A | 6/1987 | Gallus |
| 4,678,037 A | 7/1987 | Smith |
| 4,681,133 A | 7/1987 | Weston |
| 4,688,641 A | 8/1987 | Knieriemen |
| 4,690,796 A | 9/1987 | Paliwal |
| 4,693,863 A | 9/1987 | Del Corso et al. |
| 4,703,807 A | 11/1987 | Weston |
| 4,706,753 A | 11/1987 | Ohkochi et al. |
| 4,708,202 A | 11/1987 | Sukup et al. |
| 4,708,208 A | 11/1987 | Halbardier |
| 4,709,761 A | 12/1987 | Setterberg, Jr. |
| 4,714,116 A | 12/1987 | Brunner |
| 4,716,964 A | 1/1988 | Erbstoesser et al. |
| 4,719,971 A | 1/1988 | Owens |
| 4,721,159 A | 1/1988 | Ohkochi et al. |
| 4,738,599 A | 4/1988 | Shilling |
| 4,741,973 A | 5/1988 | Condit et al. |
| 4,768,588 A | 9/1988 | Kupsa |
| 4,775,598 A * | 10/1988 | Jaeckel .................. 428/550 |
| 4,784,226 A | 11/1988 | Wyatt |
| 4,805,699 A | 2/1989 | Halbardier |
| 4,817,725 A | 4/1989 | Jenkins |
| 4,834,184 A | 5/1989 | Streich et al. |
| H635 H | 6/1989 | Johnson et al. |
| 4,850,432 A | 7/1989 | Porter et al. |
| 4,853,056 A | 8/1989 | Hoffman |
| 4,869,324 A | 9/1989 | Holder |
| 4,869,325 A | 9/1989 | Halbardier |
| 4,880,059 A | 11/1989 | Brandell et al. |
| 4,889,187 A | 12/1989 | Terrell et al. |
| 4,890,675 A | 1/1990 | Dew |
| 4,901,794 A | 2/1990 | Baugh et al. |
| 4,909,320 A | 3/1990 | Hebert et al. |
| 4,917,966 A | 4/1990 | Wilde et al. |
| 4,921,664 A | 5/1990 | Couper |
| 4,929,415 A | 5/1990 | Okazaki |
| 4,932,474 A | 6/1990 | Schroeder, Jr. et al. |
| 4,938,309 A | 7/1990 | Emdy |
| 4,938,809 A | 7/1990 | Das et al. |
| 4,944,351 A | 7/1990 | Eriksen et al. |
| 4,949,788 A | 8/1990 | Szarka et al. |
| 4,952,902 A | 8/1990 | Kawaguchi et al. |
| 4,975,412 A | 12/1990 | Okazaki et al. |
| 4,977,958 A | 12/1990 | Miller |
| 4,981,177 A | 1/1991 | Carmody et al. |
| 4,986,361 A | 1/1991 | Mueller et al. |
| 4,997,622 A | 3/1991 | Regazzoni et al. |
| 5,006,044 A | 4/1991 | Walker, Sr. et al. |
| 5,010,955 A | 4/1991 | Springer |
| 5,036,921 A | 8/1991 | Pittard et al. |
| 5,048,611 A | 9/1991 | Cochran |
| 5,049,165 A | 9/1991 | Tselesin |
| 5,061,323 A | 10/1991 | DeLuccia |
| 5,063,775 A | 11/1991 | Walker, Sr. et al. |
| 5,073,207 A | 12/1991 | Faure et al. |
| 5,074,361 A | 12/1991 | Brisco et al. |
| 5,076,869 A | 12/1991 | Bourell et al. |
| 5,084,088 A | 1/1992 | Okazaki |
| 5,087,304 A | 2/1992 | Chang et al. |
| 5,090,480 A | 2/1992 | Pittard et al. |
| 5,095,988 A | 3/1992 | Bode |
| 5,103,911 A | 4/1992 | Heijnen |
| 5,117,915 A | 6/1992 | Mueller et al. |
| 5,161,614 A | 11/1992 | Wu et al. |
| 5,171,734 A | 12/1992 | Sanjurjo et al. |
| 5,178,216 A | 1/1993 | Giroux et al. |
| 5,181,571 A | 1/1993 | Mueller et al. |
| 5,183,631 A | 2/1993 | Kugimiya et al. |
| 5,188,182 A | 2/1993 | Echols, III et al. |

(56) References Cited

U.S. PATENT DOCUMENTS

| | | |
|---|---|---|
| 5,188,183 A | 2/1993 | Hopmann et al. |
| 5,204,055 A | 4/1993 | Sachs et al. |
| 5,222,867 A | 6/1993 | Walker, Sr. et al. |
| 5,226,483 A | 7/1993 | Williamson, Jr. |
| 5,228,518 A | 7/1993 | Wilson et al. |
| 5,234,055 A | 8/1993 | Cornette |
| 5,252,365 A | 10/1993 | White |
| 5,253,714 A | 10/1993 | Davis et al. |
| 5,271,468 A | 12/1993 | Streich et al. |
| 5,273,569 A | 12/1993 | Gilman et al. |
| 5,282,509 A | 2/1994 | Schurr, III |
| 5,285,798 A | 2/1994 | Banerjee et al. |
| 5,292,478 A | 3/1994 | Scorey |
| 5,293,940 A | 3/1994 | Hromas et al. |
| 5,304,260 A | 4/1994 | Aikawa et al. |
| 5,304,588 A | 4/1994 | Boysen et al. |
| 5,309,874 A | 5/1994 | Willermet et al. |
| 5,310,000 A | 5/1994 | Arterbury et al. |
| 5,316,598 A | 5/1994 | Chang et al. |
| 5,318,746 A | 6/1994 | Lashmore et al. |
| 5,380,473 A | 1/1995 | Bogue et al. |
| 5,387,380 A | 2/1995 | Cima et al. |
| 5,392,860 A | 2/1995 | Ross |
| 5,394,236 A | 2/1995 | Murnick |
| 5,394,941 A | 3/1995 | Venditto et al. |
| 5,398,754 A | 3/1995 | Dinhoble |
| 5,407,011 A | 4/1995 | Layton |
| 5,409,555 A | 4/1995 | Fujita et al. |
| 5,411,082 A | 5/1995 | Kennedy |
| 5,417,285 A | 5/1995 | Van Buskirk et al. |
| 5,425,424 A | 6/1995 | Reinhardt et al. |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |
| 5,456,317 A | 10/1995 | Hood, III et al. |
| 5,456,327 A | 10/1995 | Denton et al. |
| 5,464,062 A | 11/1995 | Blizzard, Jr. |
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,479,986 A | 1/1996 | Gano et al. |
| 5,494,538 A | 2/1996 | Kirillov et al. |
| 5,506,055 A | 4/1996 | Dorfman et al. |
| 5,507,439 A | 4/1996 | Story |
| 5,511,620 A | 4/1996 | Baugh et al. |
| 5,524,699 A | 6/1996 | Cook |
| 5,526,880 A | 6/1996 | Jordan, Jr. et al. |
| 5,526,881 A | 6/1996 | Martin et al. |
| 5,529,746 A | 6/1996 | Knoss et al. |
| 5,531,735 A | 7/1996 | Thompson |
| 5,533,573 A | 7/1996 | Jordan, Jr. et al. |
| 5,536,485 A | 7/1996 | Kume et al. |
| 5,558,153 A | 9/1996 | Holcombe et al. |
| 5,601,924 A | 2/1997 | Beane |
| 5,607,017 A | 3/1997 | Owens et al. |
| 5,623,993 A | 4/1997 | Van Buskirk et al. |
| 5,623,994 A | 4/1997 | Robinson |
| 5,636,691 A | 6/1997 | Hendrickson et al. |
| 5,641,023 A | 6/1997 | Ross et al. |
| 5,647,444 A | 7/1997 | Williams |
| 5,665,289 A | 9/1997 | Chung et al. |
| 5,677,372 A | 10/1997 | Yamamoto et al. |
| 5,685,372 A | 11/1997 | Gano |
| 5,701,576 A | 12/1997 | Fujita et al. |
| 5,707,214 A | 1/1998 | Schmidt |
| 5,709,269 A | 1/1998 | Head |
| 5,720,344 A | 2/1998 | Newman |
| 5,722,033 A | 2/1998 | Carden |
| 5,728,195 A | 3/1998 | Eastman et al. |
| 5,765,639 A | 6/1998 | Muth |
| 5,772,735 A | 6/1998 | Sehgal et al. |
| 5,782,305 A | 7/1998 | Hicks |
| 5,797,454 A | 8/1998 | Hipp |
| 5,820,608 A | 10/1998 | Luzio et al. |
| 5,826,652 A | 10/1998 | Tapp |
| 5,826,661 A | 10/1998 | Parker et al. |
| 5,829,520 A | 11/1998 | Johnson |
| 5,836,396 A | 11/1998 | Norman |
| 5,857,521 A | 1/1999 | Ross et al. |
| 5,881,816 A | 3/1999 | Wright |
| 5,896,819 A | 4/1999 | Turila et al. |
| 5,902,424 A | 5/1999 | Fujita et al. |
| 5,934,372 A | 8/1999 | Muth |
| 5,941,309 A | 8/1999 | Appleton |
| 5,960,881 A | 10/1999 | Allamon et al. |
| 5,964,965 A | 10/1999 | Schulz et al. |
| 5,985,466 A | 11/1999 | Atarashi et al. |
| 5,988,287 A | 11/1999 | Jordan, Jr. et al. |
| 5,990,051 A | 11/1999 | Ischy et al. |
| 5,992,452 A | 11/1999 | Nelson, II |
| 5,992,520 A | 11/1999 | Schultz et al. |
| 6,007,314 A | 12/1999 | Nelson, II |
| 3,030,637 A | 2/2000 | Whitehead |
| 6,024,915 A | 2/2000 | Kume et al. |
| 6,032,735 A | 3/2000 | Echols |
| 6,036,777 A | 3/2000 | Sachs |
| 6,047,773 A | 4/2000 | Zeltmann et al. |
| 6,050,340 A | 4/2000 | Scott |
| 6,069,313 A | 5/2000 | Kay |
| 6,076,600 A | 6/2000 | Vick, Jr. et al. |
| 6,079,496 A | 6/2000 | Hirth |
| 6,085,837 A | 7/2000 | Massinon et al. |
| 6,095,247 A | 8/2000 | Streich et al. |
| 6,119,783 A | 9/2000 | Parker et al. |
| 6,142,237 A | 11/2000 | Christmas et al. |
| 6,161,622 A | 12/2000 | Robb et al. |
| 6,167,970 B1 | 1/2001 | Stout et al. |
| 6,170,583 B1 | 1/2001 | Boyce |
| 6,171,359 B1 | 1/2001 | Levinski et al. |
| 6,173,779 B1 | 1/2001 | Smith |
| 6,176,323 B1 | 1/2001 | Weirich et al. |
| 6,189,616 B1 | 2/2001 | Gano et al. |
| 6,189,618 B1 | 2/2001 | Beeman et al. |
| 6,213,202 B1 | 4/2001 | Read, Jr. |
| 6,220,350 B1 | 4/2001 | Brothers et al. |
| 6,220,357 B1 | 4/2001 | Carmichael et al. |
| 6,228,904 B1 | 5/2001 | Yadav et al. |
| 6,237,688 B1 | 5/2001 | Burleson et al. |
| 6,238,280 B1 | 5/2001 | Ritt et al. |
| 6,241,021 B1 | 6/2001 | Bowling |
| 6,248,399 B1 | 6/2001 | Hehmann |
| 6,250,392 B1 | 6/2001 | Muth |
| 6,261,432 B1 | 7/2001 | Huber et al. |
| 6,265,205 B1 | 7/2001 | Hitchens et al. |
| 6,273,187 B1 | 8/2001 | Voisin, Jr. et al. |
| 6,276,452 B1 | 8/2001 | Davis et al. |
| 6,276,457 B1 | 8/2001 | Moffatt et al. |
| 6,279,656 B1 | 8/2001 | Sinclair et al. |
| 6,287,332 B1 | 9/2001 | Bolz et al. |
| 6,287,445 B1 | 9/2001 | Lashmore et al. |
| 6,302,205 B1 | 10/2001 | Ryll |
| 6,315,041 B1 | 11/2001 | Carlisle et al. |
| 6,315,050 B2 | 11/2001 | Vaynshteyn et al. |
| 6,325,148 B1 | 12/2001 | Trahan et al. |
| 6,328,110 B1 | 12/2001 | Joubert |
| 6,341,653 B1 | 1/2002 | Firmaniuk et al. |
| 6,341,747 B1 | 1/2002 | Schmidt et al. |
| 6,349,766 B1 | 2/2002 | Bussear et al. |
| 6,354,372 B1 | 3/2002 | Carisella et al. |
| 6,354,379 B2 | 3/2002 | Miszewski et al. |
| 6,357,332 B1 | 3/2002 | Vecchio |
| 6,371,206 B1 | 4/2002 | Mills |
| 6,372,346 B1 | 4/2002 | Toth |
| 6,382,244 B2 | 5/2002 | Vann |
| 6,390,195 B1 | 5/2002 | Nguyen et al. |
| 6,390,200 B1 | 5/2002 | Allamon et al. |
| 6,394,180 B1 | 5/2002 | Berscheidt et al. |
| 6,394,185 B1 | 5/2002 | Constien |
| 6,395,402 B1 | 5/2002 | Lambert et al. |
| 6,397,950 B1 | 6/2002 | Streich et al. |
| 6,401,547 B1 | 6/2002 | Hatfield et al. |
| 6,403,210 B1 | 6/2002 | Stuivinga et al. |
| 6,408,946 B1 | 6/2002 | Marshall et al. |

(56) References Cited

U.S. PATENT DOCUMENTS

| | | |
|---|---|---|
| 6,419,023 B1 | 7/2002 | George et al. |
| 6,439,313 B1 | 8/2002 | Thomeer et al. |
| 6,446,717 B1 | 9/2002 | White et al. |
| 6,457,525 B1 | 10/2002 | Scott |
| 6,467,546 B2 | 10/2002 | Allamon et al. |
| 6,470,965 B1 | 10/2002 | Winzer |
| 6,491,097 B1 | 12/2002 | Oneal et al. |
| 6,491,116 B2 | 12/2002 | Berscheidt et al. |
| 6,513,598 B2 | 2/2003 | Moore et al. |
| 6,513,600 B2 | 2/2003 | Ross |
| 6,540,033 B1 | 4/2003 | Sullivan et al. |
| 6,543,543 B2 | 4/2003 | Muth |
| 6,561,275 B2 | 5/2003 | Glass et al. |
| 6,588,507 B2 | 7/2003 | Dusterhoft et al. |
| 6,591,915 B2 | 7/2003 | Burris et al. |
| 6,601,648 B2 | 8/2003 | Ebinger |
| 6,601,650 B2 | 8/2003 | Sundararajan |
| 6,609,569 B2 | 8/2003 | Howlett et al. |
| 6,612,826 B1 | 9/2003 | Bauer et al. |
| 6,613,383 B1 | 9/2003 | George et al. |
| 6,619,400 B2 | 9/2003 | Brunet |
| 6,630,008 B1 | 10/2003 | Meeks, III et al. |
| 6,634,428 B2 | 10/2003 | Krauss et al. |
| 6,662,886 B2 | 12/2003 | Russell |
| 6,675,889 B1 | 1/2004 | Mullins et al. |
| 6,699,305 B2 | 3/2004 | Myrick |
| 6,712,153 B2 | 3/2004 | Turley et al. |
| 6,712,797 B1 | 3/2004 | Southern, Jr. |
| 6,713,177 B2 | 3/2004 | George et al. |
| 6,715,541 B2 | 4/2004 | Pedersen et al. |
| 6,719,051 B2 | 4/2004 | Hailey, Jr. et al. |
| 6,755,249 B2 | 6/2004 | Robison et al. |
| 6,769,491 B2 | 8/2004 | Zimmerman et al. |
| 6,776,228 B2 | 8/2004 | Pedersen et al. |
| 6,779,599 B2 | 8/2004 | Mullins et al. |
| 6,799,638 B2 | 10/2004 | Butterfield, Jr. |
| 6,810,960 B2 | 11/2004 | Pia |
| 6,817,414 B2 | 11/2004 | Lee |
| 6,831,044 B2 | 12/2004 | Constien |
| 6,883,611 B2 | 4/2005 | Smith et al. |
| 6,887,297 B2 | 5/2005 | Winter et al. |
| 6,896,049 B2 | 5/2005 | Moyes |
| 6,896,061 B2 | 5/2005 | Hriscu et al. |
| 6,899,176 B2 | 5/2005 | Hailey, Jr. et al. |
| 6,899,777 B2 | 5/2005 | Vaidyanathan et al. |
| 6,908,516 B2 | 6/2005 | Hehmann et al. |
| 6,913,827 B2 | 7/2005 | George et al. |
| 6,926,086 B2 | 8/2005 | Patterson et al. |
| 6,932,159 B2 | 8/2005 | Hovem |
| 6,939,388 B2 | 9/2005 | Angeliu |
| 6,945,331 B2 | 9/2005 | Patel |
| 6,951,331 B2 | 10/2005 | Haughom et al. |
| 6,959,759 B2 | 11/2005 | Doane et al. |
| 6,973,970 B2 | 12/2005 | Johnston et al. |
| 6,973,973 B2 | 12/2005 | Howard et al. |
| 6,983,796 B2 | 1/2006 | Bayne et al. |
| 6,986,390 B2 | 1/2006 | Doane et al. |
| 7,013,989 B2 | 3/2006 | Hammond et al. |
| 7,013,998 B2 | 3/2006 | Ray et al. |
| 7,017,664 B2 | 3/2006 | Walker et al. |
| 7,017,677 B2 | 3/2006 | Keshavan et al. |
| 7,021,389 B2 | 4/2006 | Bishop et al. |
| 7,025,146 B2 | 4/2006 | King et al. |
| 7,028,778 B2 | 4/2006 | Krywitsky |
| 7,044,230 B2 | 5/2006 | Starr et al. |
| 7,048,812 B2 | 5/2006 | Bettles et al. |
| 7,049,272 B2 | 5/2006 | Sinclair et al. |
| 7,051,805 B2 | 5/2006 | Doane et al. |
| 7,059,410 B2 | 6/2006 | Bousche et al. |
| 7,063,748 B2 | 6/2006 | Talton |
| 7,090,027 B1 | 8/2006 | Williams |
| 7,093,664 B2 | 8/2006 | Todd et al. |
| 7,096,945 B2 | 8/2006 | Richards et al. |
| 7,096,946 B2 | 8/2006 | Jasser et al. |
| 7,097,807 B1 | 8/2006 | Meeks, III et al. |
| 7,097,906 B2 | 8/2006 | Gardner |
| 7,108,080 B2 | 9/2006 | Tessari et al. |
| 7,111,682 B2 | 9/2006 | Blaisdell |
| 7,128,145 B2 | 10/2006 | Mickey |
| 7,141,207 B2 | 11/2006 | Jandeska, Jr. et al. |
| 7,150,326 B2 | 12/2006 | Bishop et al. |
| 7,163,066 B2 | 1/2007 | Lehr |
| 7,165,622 B2 | 1/2007 | Hirth et al. |
| 7,168,494 B2 | 1/2007 | Starr et al. |
| 7,174,963 B2 | 2/2007 | Bertelsen |
| 7,182,135 B2 | 2/2007 | Szarka |
| 7,188,559 B1 | 3/2007 | Vecchio |
| 7,210,527 B2 | 5/2007 | Walker et al. |
| 7,210,533 B2 | 5/2007 | Starr et al. |
| 7,217,311 B2 | 5/2007 | Hong et al. |
| 7,234,530 B2 | 6/2007 | Gass |
| 7,250,188 B2 | 7/2007 | Dodelet et al. |
| 7,252,162 B2 | 8/2007 | Akinlade et al. |
| 7,255,172 B2 | 8/2007 | Johnson |
| 7,255,178 B2 | 8/2007 | Slup et al. |
| 7,264,060 B2 | 9/2007 | Wills |
| 7,267,172 B2 | 9/2007 | Hofman |
| 7,267,178 B2 | 9/2007 | Krywitsky |
| 7,270,186 B2 | 9/2007 | Johnson |
| 7,287,592 B2 | 10/2007 | Surjaatmadja et al. |
| 7,311,152 B2 | 12/2007 | Howard et al. |
| 7,316,274 B2 | 1/2008 | Xu et al. |
| 7,320,365 B2 | 1/2008 | Pia |
| 7,322,412 B2 | 1/2008 | Badalamenti et al. |
| 7,322,417 B2 | 1/2008 | Rytlewski et al. |
| 7,325,617 B2 | 2/2008 | Murray |
| 7,328,750 B2 | 2/2008 | Swor et al. |
| 7,331,388 B2 | 2/2008 | Vilela et al. |
| 7,337,854 B2 | 3/2008 | Horn et al. |
| 7,346,456 B2 | 3/2008 | Le Bemadjiel |
| 7,350,582 B2 | 4/2008 | McKeachnie et al. |
| 7,353,867 B2 | 4/2008 | Carter et al. |
| 7,353,879 B2 | 4/2008 | Todd et al. |
| 7,360,593 B2 | 4/2008 | Constien |
| 7,360,597 B2 | 4/2008 | Blaisdell |
| 7,363,970 B2 | 4/2008 | Corre et al. |
| 7,373,978 B2 | 5/2008 | Barry et al. |
| 7,380,600 B2 | 6/2008 | Willberg et al. |
| 7,384,443 B2 | 6/2008 | Mirchandani |
| 7,387,158 B2 | 6/2008 | Murray et al. |
| 7,387,165 B2 | 6/2008 | Lopez de Cardenas et al. |
| 7,392,841 B2 | 7/2008 | Murray et al. |
| 7,401,648 B2 | 7/2008 | Richard |
| 7,416,029 B2 | 8/2008 | Telfer et al. |
| 7,422,058 B2 | 9/2008 | O'Malley |
| 7,426,964 B2 | 9/2008 | Lynde et al. |
| 7,441,596 B2 | 10/2008 | Wood et al. |
| 7,445,049 B2 | 11/2008 | Howard et al. |
| 7,451,815 B2 | 11/2008 | Hailey, Jr. |
| 7,451,817 B2 | 11/2008 | Reddy et al. |
| 7,461,699 B2 | 12/2008 | Richard et al. |
| 7,464,764 B2 | 12/2008 | Xu |
| 7,472,750 B2 | 1/2009 | Walker et al. |
| 7,478,676 B2 | 1/2009 | East, Jr. et al. |
| 7,503,390 B2 | 3/2009 | Gomez |
| 7,503,399 B2 | 3/2009 | Badalamenti et al. |
| 7,509,993 B1 | 3/2009 | Turng et al. |
| 7,510,018 B2 | 3/2009 | Williamson et al. |
| 7,513,311 B2 | 4/2009 | Gramstad et al. |
| 7,516,791 B2 | 4/2009 | Bryant et al. |
| 7,527,103 B2 | 5/2009 | Huang et al. |
| 7,537,825 B1 | 5/2009 | Wardle et al. |
| 7,552,777 B2 | 6/2009 | Murray et al. |
| 7,552,779 B2 | 6/2009 | Murray |
| 7,559,357 B2 | 7/2009 | Clem |
| 7,575,062 B2 | 8/2009 | East, Jr. |
| 7,579,087 B2 | 8/2009 | Maloney et al. |
| 7,591,318 B2 | 9/2009 | Tilghman |
| 7,600,572 B2 | 10/2009 | Slup et al. |
| 7,604,049 B2 | 10/2009 | Vaidya et al. |
| 7,604,055 B2 | 10/2009 | Richard et al. |
| 7,607,476 B2 | 10/2009 | Tom et al. |
| 7,617,871 B2 | 11/2009 | Surjaatmadja et al. |
| 7,635,023 B2 | 12/2009 | Goldberg et al. |

(56) References Cited

U.S. PATENT DOCUMENTS

| | | |
|---|---|---|
| 7,640,988 B2 | 1/2010 | Phi et al. |
| 7,661,480 B2 | 2/2010 | Al-Anazi |
| 7,661,481 B2 | 2/2010 | Todd et al. |
| 7,665,537 B2 | 2/2010 | Patel et al. |
| 7,686,082 B2 | 3/2010 | Marsh |
| 7,690,436 B2 | 4/2010 | Turley et al. |
| 7,699,101 B2 | 4/2010 | Fripp et al. |
| 7,703,510 B2 | 4/2010 | Xu |
| 7,703,511 B2 | 4/2010 | Buyers et al. |
| 7,708,078 B2 | 5/2010 | Stoesz |
| 7,709,421 B2 | 5/2010 | Jones et al. |
| 7,712,541 B2 | 5/2010 | Loretz et al. |
| 7,723,272 B2 | 5/2010 | Crews et al. |
| 7,726,406 B2 | 6/2010 | Xu |
| 7,735,578 B2 | 6/2010 | Loehr et al. |
| 7,743,836 B2 | 6/2010 | Cook et al. |
| 7,752,971 B2 | 7/2010 | Loehr |
| 7,757,773 B2 | 7/2010 | Rytlewski |
| 7,762,342 B2 | 7/2010 | Richard et al. |
| 7,770,652 B2 | 8/2010 | Barnett |
| 7,771,289 B2 | 8/2010 | Palumbo et al. |
| 7,775,284 B2 | 8/2010 | Richards et al. |
| 7,775,285 B2 | 8/2010 | Surjaatmadja et al. |
| 7,775,286 B2 | 8/2010 | Duphorne |
| 7,784,543 B2 | 8/2010 | Johnson |
| 7,793,714 B2 | 9/2010 | Johnson |
| 7,793,820 B2 | 9/2010 | Hirano et al. |
| 7,798,225 B2 | 9/2010 | Giroux et al. |
| 7,798,226 B2 | 9/2010 | Themig |
| 7,798,236 B2 | 9/2010 | McKeachnie et al. |
| 7,806,189 B2 | 10/2010 | Frazier |
| 7,806,192 B2 | 10/2010 | Foster et al. |
| 7,810,553 B2 | 10/2010 | Cruickshank et al. |
| 7,810,567 B2 | 10/2010 | Daniels et al. |
| 7,819,198 B2 | 10/2010 | Birckhead et al. |
| 7,828,055 B2 | 11/2010 | Willauer et al. |
| 7,833,944 B2 | 11/2010 | Munoz et al. |
| 7,849,927 B2 | 12/2010 | Herrera |
| 7,851,016 B2 | 12/2010 | Arbab et al. |
| 7,855,168 B2 | 12/2010 | Fuller et al. |
| 7,861,779 B2 | 1/2011 | Vestavik |
| 7,861,781 B2 | 1/2011 | D'Arcy |
| 7,874,365 B2 | 1/2011 | East, Jr. et al. |
| 7,878,253 B2 | 2/2011 | Stowe et al. |
| 7,879,367 B2 | 2/2011 | Heublein et al. |
| 7,896,091 B2 | 3/2011 | Williamson et al. |
| 7,897,063 B1 | 3/2011 | Perry et al. |
| 7,900,696 B1 | 3/2011 | Nish et al. |
| 7,900,703 B2 | 3/2011 | Clark et al. |
| 7,909,096 B2 | 3/2011 | Clark et al. |
| 7,909,104 B2 | 3/2011 | Bjorgum |
| 7,909,110 B2 | 3/2011 | Sharma et al. |
| 7,909,115 B2 | 3/2011 | Grove et al. |
| 7,913,765 B2 | 3/2011 | Crow et al. |
| 7,918,275 B2 | 4/2011 | Clem |
| 7,931,093 B2 | 4/2011 | Foster et al. |
| 7,938,191 B2 | 5/2011 | Vaidya |
| 7,946,335 B2 | 5/2011 | Bewlay et al. |
| 7,946,340 B2 | 5/2011 | Surjaatmadja et al. |
| 7,958,940 B2 | 6/2011 | Jameson |
| 7,963,331 B2 | 6/2011 | Surjaatmadja et al. |
| 7,963,340 B2 | 6/2011 | Gramstad et al. |
| 7,963,342 B2 | 6/2011 | George |
| 7,980,300 B2 | 7/2011 | Roberts et al. |
| 7,987,906 B1 | 8/2011 | Troy |
| 7,992,763 B2 | 8/2011 | Vecchio et al. |
| 8,002,821 B2 | 8/2011 | Stinson |
| 8,020,619 B1 | 9/2011 | Robertson et al. |
| 8,020,620 B2 | 9/2011 | Daniels et al. |
| 8,025,104 B2 | 9/2011 | Cooke, Jr. |
| 8,028,767 B2 | 10/2011 | Radford et al. |
| 8,033,331 B2 | 10/2011 | Themig |
| 8,039,422 B1 | 10/2011 | Al-Zahrani |
| 8,056,628 B2 | 11/2011 | Whitsitt et al. |
| 8,056,638 B2 | 11/2011 | Clayton et al. |
| 8,109,340 B2 | 2/2012 | Doane et al. |
| 8,114,148 B2 | 2/2012 | Atanasoska et al. |
| 8,127,856 B1 | 3/2012 | Nish et al. |
| 8,153,052 B2 | 4/2012 | Jackson et al. |
| 8,163,060 B2 | 4/2012 | Imanishi et al. |
| 8,211,247 B2 | 7/2012 | Marya et al. |
| 8,211,248 B2 | 7/2012 | Marya |
| 8,226,740 B2 | 7/2012 | Chaumonnot et al. |
| 8,230,731 B2 | 7/2012 | Dyer et al. |
| 8,231,947 B2 | 7/2012 | Vaidya et al. |
| 8,263,178 B2 | 9/2012 | Boulos et al. |
| 8,276,670 B2 | 10/2012 | Patel |
| 8,277,974 B2 | 10/2012 | Kumar et al. |
| 8,297,364 B2 | 10/2012 | Agrawal et al. |
| 8,327,931 B2 | 12/2012 | Agrawal et al. |
| 8,403,037 B2 | 3/2013 | Agrawal et al. |
| 8,425,651 B2 | 4/2013 | Xu et al. |
| 8,459,347 B2 | 6/2013 | Stout |
| 8,486,329 B2 | 7/2013 | Shikai et al. |
| 8,490,674 B2 | 7/2013 | Stevens et al. |
| 8,490,689 B1 | 7/2013 | McClinton et al. |
| 8,535,604 B1 | 9/2013 | Baker et al. |
| 8,631,876 B2 | 1/2014 | Xu et al. |
| 8,663,401 B2 | 3/2014 | Marya et al. |
| 8,715,339 B2 | 5/2014 | Atanasoska et al. |
| 8,734,602 B2 | 5/2014 | Li et al. |
| 8,905,147 B2 | 12/2014 | Fripp et al. |
| 8,978,734 B2 | 3/2015 | Stevens |
| 8,998,978 B2 | 4/2015 | Wang |
| 9,044,397 B2 | 6/2015 | Choi et al. |
| 9,057,117 B2 | 6/2015 | Harrison et al. |
| 9,057,242 B2 | 6/2015 | Mazyar et al. |
| 9,080,098 B2 | 7/2015 | Xu et al. |
| 9,089,408 B2 | 7/2015 | Xu |
| 9,119,906 B2 | 9/2015 | Tomantschger et al. |
| 9,163,467 B2 | 10/2015 | Gaudette et al. |
| 9,211,586 B1 | 12/2015 | Lavernia et al. |
| 9,260,935 B2 | 2/2016 | Murphree et al. |
| 2001/0040180 A1* | 11/2001 | Wittebrood et al. .......... 228/219 |
| 2001/0045285 A1 | 11/2001 | Russell |
| 2001/0045288 A1 | 11/2001 | Allamon et al. |
| 2002/0000319 A1 | 1/2002 | Brunet |
| 2002/0007948 A1 | 1/2002 | Bayne et al. |
| 2002/0014268 A1 | 2/2002 | Vann |
| 2002/0020527 A1 | 2/2002 | Kilaas et al. |
| 2002/0047058 A1 | 4/2002 | Verhoff et al. |
| 2002/0066572 A1 | 6/2002 | Muth |
| 2002/0092654 A1 | 7/2002 | Coronado et al. |
| 2002/0104616 A1 | 8/2002 | De et al. |
| 2002/0108756 A1 | 8/2002 | Harrall et al. |
| 2002/0136904 A1 | 9/2002 | Glass et al. |
| 2002/0139541 A1 | 10/2002 | Sheffield et al. |
| 2002/0162661 A1 | 11/2002 | Krauss et al. |
| 2003/0019639 A1 | 1/2003 | MacKay |
| 2003/0037925 A1 | 2/2003 | Walker et al. |
| 2003/0060374 A1 | 3/2003 | Cooke, Jr. |
| 2003/0075326 A1 | 4/2003 | Ebinger |
| 2003/0104147 A1 | 6/2003 | Bretschneider |
| 2003/0111728 A1 | 6/2003 | Thai et al. |
| 2003/0127013 A1 | 7/2003 | Zavitsanos et al. |
| 2003/0141060 A1 | 7/2003 | Hailey et al. |
| 2003/0141061 A1 | 7/2003 | Hailey et al. |
| 2003/0141079 A1 | 7/2003 | Doane et al. |
| 2003/0150614 A1 | 8/2003 | Brown et al. |
| 2003/0155114 A1 | 8/2003 | Pedersen et al. |
| 2003/0155115 A1 | 8/2003 | Pedersen et al. |
| 2003/0159828 A1 | 8/2003 | Howard et al. |
| 2003/0164237 A1 | 9/2003 | Butterfield |
| 2003/0183391 A1 | 10/2003 | Hriscu et al. |
| 2004/0005483 A1 | 1/2004 | Lin |
| 2004/0020832 A1 | 2/2004 | Richards et al. |
| 2004/0045723 A1 | 3/2004 | Slup et al. |
| 2004/0055758 A1 | 3/2004 | Brezinski et al. |
| 2004/0069502 A1 | 4/2004 | Luke |
| 2004/0089449 A1 | 5/2004 | Walton et al. |
| 2004/0094297 A1 | 5/2004 | Malone et al. |
| 2004/0154806 A1 | 8/2004 | Bode et al. |
| 2004/0159428 A1 | 8/2004 | Hammond et al. |
| 2004/0159446 A1 | 8/2004 | Haugen et al. |

(56) References Cited

U.S. PATENT DOCUMENTS

| | | |
|---|---|---|
| 2004/0182583 A1 | 9/2004 | Doane et al. |
| 2004/0216868 A1 | 11/2004 | Owen, Sr. |
| 2004/0231845 A1 | 11/2004 | Cooke, Jr. |
| 2004/0251025 A1 | 12/2004 | Giroux et al. |
| 2004/0256109 A1 | 12/2004 | Johnson |
| 2004/0256157 A1 | 12/2004 | Tessari et al. |
| 2004/0261993 A1 | 12/2004 | Nguyen |
| 2004/0261994 A1 | 12/2004 | Nguyen et al. |
| 2005/0034876 A1 | 2/2005 | Doane et al. |
| 2005/0051329 A1 | 3/2005 | Blaisdell |
| 2005/0064247 A1 | 3/2005 | Sane et al. |
| 2005/0069449 A1 | 3/2005 | Jackson et al. |
| 2005/0074612 A1 | 4/2005 | Eklund et al. |
| 2005/0098313 A1 | 5/2005 | Atkins et al. |
| 2005/0102255 A1 | 5/2005 | Bultman |
| 2005/0106316 A1* | 5/2005 | Rigney et al. ............... 427/140 |
| 2005/0161212 A1 | 7/2005 | Leismer et al. |
| 2005/0161224 A1 | 7/2005 | Starr et al. |
| 2005/0165149 A1 | 7/2005 | Chanak et al. |
| 2005/0194143 A1 | 9/2005 | Xu et al. |
| 2005/0205264 A1 | 9/2005 | Starr et al. |
| 2005/0205265 A1 | 9/2005 | Todd et al. |
| 2005/0205266 A1 | 9/2005 | Todd et al. |
| 2005/0235757 A1 | 10/2005 | De Jonge et al. |
| 2005/0241824 A1 | 11/2005 | Burris, II et al. |
| 2005/0241825 A1 | 11/2005 | Burris, II et al. |
| 2005/0257936 A1 | 11/2005 | Lehr |
| 2005/0268746 A1 | 12/2005 | Abkowitz et al. |
| 2005/0269097 A1 | 12/2005 | Towler |
| 2005/0275143 A1 | 12/2005 | Toth |
| 2005/0279501 A1 | 12/2005 | Surjaatmadja et al. |
| 2006/0012087 A1 | 1/2006 | Matsuda et al. |
| 2006/0013350 A1 | 1/2006 | Akers |
| 2006/0045787 A1 | 3/2006 | Jandeska, Jr. et al. |
| 2006/0057479 A1 | 3/2006 | Niimi et al. |
| 2006/0081378 A1 | 4/2006 | Howard et al. |
| 2006/0102871 A1 | 5/2006 | Wang et al. |
| 2006/0108114 A1 | 5/2006 | Johnson et al. |
| 2006/0108126 A1 | 5/2006 | Horn et al. |
| 2006/0110615 A1 | 5/2006 | Karim et al. |
| 2006/0116696 A1 | 6/2006 | Odermatt et al. |
| 2006/0124310 A1 | 6/2006 | Lopez de Cardenas |
| 2006/0124312 A1 | 6/2006 | Rytlewski et al. |
| 2006/0131011 A1 | 6/2006 | Lynde et al. |
| 2006/0131031 A1 | 6/2006 | McKeachnie et al. |
| 2006/0131081 A1 | 6/2006 | Mirchandani et al. |
| 2006/0144515 A1 | 7/2006 | Tada et al. |
| 2006/0150770 A1 | 7/2006 | Freim |
| 2006/0151178 A1 | 7/2006 | Howard et al. |
| 2006/0153728 A1 | 7/2006 | Schoenung et al. |
| 2006/0162927 A1 | 7/2006 | Walker et al. |
| 2006/0169453 A1 | 8/2006 | Savery et al. |
| 2006/0186602 A1 | 8/2006 | Martin et al. |
| 2006/0207763 A1 | 9/2006 | Hofman et al. |
| 2006/0213670 A1 | 9/2006 | Bishop et al. |
| 2006/0231253 A1 | 10/2006 | Vilela et al. |
| 2006/0269437 A1 | 11/2006 | Pandey |
| 2006/0283592 A1 | 12/2006 | Sierra et al. |
| 2007/0017674 A1 | 1/2007 | Blaisdell |
| 2007/0017675 A1 | 1/2007 | Hammami et al. |
| 2007/0029082 A1 | 2/2007 | Giroux et al. |
| 2007/0039161 A1 | 2/2007 | Garcia |
| 2007/0039741 A1 | 2/2007 | Hailey |
| 2007/0044958 A1 | 3/2007 | Rytlewski et al. |
| 2007/0044966 A1 | 3/2007 | Davies et al. |
| 2007/0051521 A1 | 3/2007 | Fike et al. |
| 2007/0053785 A1 | 3/2007 | Hetz et al. |
| 2007/0054101 A1 | 3/2007 | Sigalas et al. |
| 2007/0057415 A1 | 3/2007 | Katagiri et al. |
| 2007/0062644 A1 | 3/2007 | Nakamura et al. |
| 2007/0074601 A1 | 4/2007 | Hong et al. |
| 2007/0074873 A1 | 4/2007 | McKeachnie et al. |
| 2007/0102199 A1 | 5/2007 | Smith et al. |
| 2007/0107899 A1 | 5/2007 | Werner et al. |
| 2007/0107908 A1 | 5/2007 | Vaidya et al. |
| 2007/0108060 A1 | 5/2007 | Park |
| 2007/0119600 A1 | 5/2007 | Slup et al. |
| 2007/0131912 A1 | 6/2007 | Simone et al. |
| 2007/0134496 A1 | 6/2007 | Katagiri et al. |
| 2007/0151009 A1 | 7/2007 | Conrad, III et al. |
| 2007/0151769 A1 | 7/2007 | Slutz et al. |
| 2007/0169935 A1 | 7/2007 | Akbar et al. |
| 2007/0181224 A1 | 8/2007 | Marya et al. |
| 2007/0185655 A1 | 8/2007 | Le Bemadjiel |
| 2007/0187095 A1 | 8/2007 | Walker et al. |
| 2007/0207182 A1 | 9/2007 | Weber et al. |
| 2007/0221373 A1 | 9/2007 | Murray |
| 2007/0221384 A1 | 9/2007 | Murray |
| 2007/0227745 A1 | 10/2007 | Roberts et al. |
| 2007/0259994 A1 | 11/2007 | Tour et al. |
| 2007/0261862 A1 | 11/2007 | Murray |
| 2007/0270942 A1 | 11/2007 | Thomas |
| 2007/0272411 A1 | 11/2007 | Lopez De Cardenas et al. |
| 2007/0272413 A1 | 11/2007 | Rytlewski et al. |
| 2007/0277979 A1 | 12/2007 | Todd et al. |
| 2007/0284109 A1 | 12/2007 | East et al. |
| 2007/0284112 A1 | 12/2007 | Magne et al. |
| 2007/0299510 A1 | 12/2007 | Venkatraman et al. |
| 2008/0011473 A1 | 1/2008 | Wood et al. |
| 2008/0020923 A1 | 1/2008 | Debe et al. |
| 2008/0047707 A1 | 2/2008 | Boney et al. |
| 2008/0060810 A9 | 3/2008 | Nguyen et al. |
| 2008/0066923 A1 | 3/2008 | Xu |
| 2008/0066924 A1 | 3/2008 | Xu |
| 2008/0072705 A1 | 3/2008 | Chaumonnot et al. |
| 2008/0078553 A1 | 4/2008 | George |
| 2008/0081866 A1 | 4/2008 | Gong et al. |
| 2008/0093073 A1 | 4/2008 | Bustos et al. |
| 2008/0099209 A1 | 5/2008 | Loretz et al. |
| 2008/0105438 A1 | 5/2008 | Jordan et al. |
| 2008/0115932 A1 | 5/2008 | Cooke |
| 2008/0121390 A1 | 5/2008 | O'Malley et al. |
| 2008/0121436 A1 | 5/2008 | Slay et al. |
| 2008/0127475 A1 | 6/2008 | Griffo |
| 2008/0135249 A1 | 6/2008 | Fripp et al. |
| 2008/0149325 A1 | 6/2008 | Crawford |
| 2008/0149345 A1 | 6/2008 | Marya et al. |
| 2008/0149351 A1 | 6/2008 | Marya et al. |
| 2008/0169105 A1 | 7/2008 | Williamson et al. |
| 2008/0169130 A1 | 7/2008 | Norman et al. |
| 2008/0179060 A1 | 7/2008 | Surjaatmadja et al. |
| 2008/0179104 A1 | 7/2008 | Zhang et al. |
| 2008/0196801 A1 | 8/2008 | Zhao et al. |
| 2008/0202764 A1 | 8/2008 | Clayton et al. |
| 2008/0202814 A1 | 8/2008 | Lyons et al. |
| 2008/0210473 A1 | 9/2008 | Zhang et al. |
| 2008/0216383 A1 | 9/2008 | Pierick et al. |
| 2008/0223586 A1 | 9/2008 | Barnett |
| 2008/0223587 A1 | 9/2008 | Cherewyk |
| 2008/0236829 A1 | 10/2008 | Lynde |
| 2008/0236842 A1 | 10/2008 | Bhavsar et al. |
| 2008/0248205 A1 | 10/2008 | Blanchet et al. |
| 2008/0248413 A1 | 10/2008 | Ishii et al. |
| 2008/0264205 A1 | 10/2008 | Zeng et al. |
| 2008/0264594 A1 | 10/2008 | Lohmueller et al. |
| 2008/0277109 A1 | 11/2008 | Vaidya |
| 2008/0277980 A1 | 11/2008 | Koda et al. |
| 2008/0282924 A1 | 11/2008 | Saenger et al. |
| 2008/0296024 A1 | 12/2008 | Huang et al. |
| 2008/0302538 A1 | 12/2008 | Hofman |
| 2008/0314581 A1 | 12/2008 | Brown |
| 2008/0314588 A1 | 12/2008 | Langlais et al. |
| 2009/0038858 A1 | 2/2009 | Griffo et al. |
| 2009/0044946 A1 | 2/2009 | Schasteen et al. |
| 2009/0044949 A1 | 2/2009 | King et al. |
| 2009/0050334 A1 | 2/2009 | Marya et al. |
| 2009/0056934 A1 | 3/2009 | Xu |
| 2009/0065216 A1 | 3/2009 | Frazier |
| 2009/0074603 A1 | 3/2009 | Chan et al. |
| 2009/0084553 A1 | 4/2009 | Rytlewski et al. |
| 2009/0084556 A1 | 4/2009 | Richards et al. |
| 2009/0084600 A1 | 4/2009 | Severance |
| 2009/0090440 A1* | 4/2009 | Kellett ............... 149/9 |
| 2009/0107684 A1 | 4/2009 | Cooke, Jr. |

(56) References Cited

U.S. PATENT DOCUMENTS

| | | |
|---|---|---|
| 2009/0114381 A1 | 5/2009 | Stroobants |
| 2009/0114382 A1 | 5/2009 | Grove et al. |
| 2009/0126436 A1 | 5/2009 | Fly et al. |
| 2009/0145666 A1 | 6/2009 | Radford et al. |
| 2009/0151949 A1 | 6/2009 | Marya et al. |
| 2009/0152009 A1 | 6/2009 | Slay et al. |
| 2009/0155616 A1* | 6/2009 | Thamida .................. 428/610 |
| 2009/0159289 A1 | 6/2009 | Avant et al. |
| 2009/0178808 A1 | 7/2009 | Williamson et al. |
| 2009/0194273 A1 | 8/2009 | Surjaatmadja et al. |
| 2009/0205841 A1 | 8/2009 | Kluge et al. |
| 2009/0211770 A1 | 8/2009 | Nutley et al. |
| 2009/0226340 A1 | 9/2009 | Marya |
| 2009/0226704 A1 | 9/2009 | Kauppinen et al. |
| 2009/0242202 A1 | 10/2009 | Rispler et al. |
| 2009/0242208 A1 | 10/2009 | Bolding |
| 2009/0242214 A1 | 10/2009 | Foster et al. |
| 2009/0255667 A1 | 10/2009 | Clem et al. |
| 2009/0255684 A1 | 10/2009 | Bolding |
| 2009/0255686 A1 | 10/2009 | Richard et al. |
| 2009/0260817 A1 | 10/2009 | Gambier et al. |
| 2009/0266548 A1 | 10/2009 | Olsen et al. |
| 2009/0272544 A1 | 11/2009 | Giroux et al. |
| 2009/0283270 A1 | 11/2009 | Langeslag |
| 2009/0293672 A1 | 12/2009 | Mirchandani |
| 2009/0301730 A1 | 12/2009 | Gweily |
| 2009/0305131 A1 | 12/2009 | Kumar et al. |
| 2009/0308588 A1 | 12/2009 | Howell et al. |
| 2009/0317556 A1 | 12/2009 | MacAry |
| 2009/0317622 A1 | 12/2009 | Huang et al. |
| 2010/0003536 A1 | 1/2010 | Smith et al. |
| 2010/0012385 A1 | 1/2010 | Drivdahl et al. |
| 2010/0015002 A1 | 1/2010 | Barrera et al. |
| 2010/0015469 A1* | 1/2010 | Romanowski ............... 428/649 |
| 2010/0025255 A1 | 2/2010 | Su et al. |
| 2010/0032151 A1 | 2/2010 | Duphorne |
| 2010/0034857 A1 | 2/2010 | Launag et al. |
| 2010/0038076 A1 | 2/2010 | Spray et al. |
| 2010/0038595 A1 | 2/2010 | Imholt et al. |
| 2010/0040180 A1 | 2/2010 | Kim et al. |
| 2010/0044041 A1 | 2/2010 | Smith et al. |
| 2010/0051278 A1 | 3/2010 | Mytopher et al. |
| 2010/0055491 A1 | 3/2010 | Vecchio et al. |
| 2010/0055492 A1 | 3/2010 | Barsoum et al. |
| 2010/0089583 A1 | 4/2010 | Xu et al. |
| 2010/0089587 A1 | 4/2010 | Stout |
| 2010/0101803 A1 | 4/2010 | Clayton et al. |
| 2010/0116495 A1 | 5/2010 | Spray |
| 2010/0122817 A1 | 5/2010 | Surjaatmadja et al. |
| 2010/0139930 A1 | 6/2010 | Patel et al. |
| 2010/0200230 A1 | 8/2010 | East, Jr. et al. |
| 2010/0209288 A1 | 8/2010 | Marya |
| 2010/0236793 A1 | 9/2010 | Bjorgum |
| 2010/0236794 A1 | 9/2010 | Duan et al. |
| 2010/0243254 A1 | 9/2010 | Murphy et al. |
| 2010/0252273 A1 | 10/2010 | Duphorne |
| 2010/0252280 A1 | 10/2010 | Swor et al. |
| 2010/0270031 A1 | 10/2010 | Patel |
| 2010/0276136 A1 | 11/2010 | Evans et al. |
| 2010/0276159 A1 | 11/2010 | Mailand et al. |
| 2010/0282338 A1 | 11/2010 | Gerrard et al. |
| 2010/0282469 A1 | 11/2010 | Richard et al. |
| 2010/0294510 A1 | 11/2010 | Holmes |
| 2010/0297432 A1 | 11/2010 | Sherman et al. |
| 2010/0304182 A1 | 12/2010 | Facchini et al. |
| 2010/0314105 A1 | 12/2010 | Rose |
| 2010/0314126 A1 | 12/2010 | Kellner |
| 2010/0319427 A1 | 12/2010 | Lohbeck |
| 2010/0319870 A1 | 12/2010 | Bewlay et al. |
| 2010/0326650 A1 | 12/2010 | Tran et al. |
| 2011/0005773 A1 | 1/2011 | Dusterhoft et al. |
| 2011/0036592 A1 | 2/2011 | Fay |
| 2011/0048743 A1 | 3/2011 | Stafford et al. |
| 2011/0052805 A1 | 3/2011 | Bordere et al. |
| 2011/0056692 A1 | 3/2011 | Lopez de Cardenas et al. |
| 2011/0056702 A1 | 3/2011 | Sharma et al. |
| 2011/0067872 A1 | 3/2011 | Agrawal |
| 2011/0067889 A1 | 3/2011 | Marya et al. |
| 2011/0067890 A1 | 3/2011 | Themig |
| 2011/0094406 A1 | 4/2011 | Marya et al. |
| 2011/0100643 A1 | 5/2011 | Themig et al. |
| 2011/0127044 A1 | 6/2011 | Radford et al. |
| 2011/0132143 A1 | 6/2011 | Xu et al. |
| 2011/0132612 A1 | 6/2011 | Agrawal et al. |
| 2011/0132619 A1 | 6/2011 | Agrawal et al. |
| 2011/0132620 A1 | 6/2011 | Agrawal et al. |
| 2011/0132621 A1* | 6/2011 | Agrawal et al. ............... 166/376 |
| 2011/0135530 A1 | 6/2011 | Xu et al. |
| 2011/0135805 A1 | 6/2011 | Doucet et al. |
| 2011/0135953 A1 | 6/2011 | Xu et al. |
| 2011/0136707 A1 | 6/2011 | Xu et al. |
| 2011/0139465 A1 | 6/2011 | Tibbles et al. |
| 2011/0147014 A1 | 6/2011 | Chen et al. |
| 2011/0186306 A1 | 8/2011 | Marya et al. |
| 2011/0214881 A1 | 9/2011 | Newton |
| 2011/0247833 A1 | 10/2011 | Todd et al. |
| 2011/0253387 A1 | 10/2011 | Ervin |
| 2011/0259610 A1 | 10/2011 | Shkurti et al. |
| 2011/0277987 A1 | 11/2011 | Frazier |
| 2011/0277989 A1 | 11/2011 | Frazier |
| 2011/0284232 A1 | 11/2011 | Huang |
| 2011/0284240 A1 | 11/2011 | Chen |
| 2011/0284243 A1 | 11/2011 | Frazier |
| 2011/0300403 A1 | 12/2011 | Vecchio et al. |
| 2011/0314881 A1 | 12/2011 | Hatcher et al. |
| 2012/0024109 A1 | 2/2012 | Xu et al. |
| 2012/0046732 A1 | 2/2012 | Sillekens et al. |
| 2012/0067426 A1 | 3/2012 | Soni et al. |
| 2012/0090839 A1 | 4/2012 | Rudic |
| 2012/0103135 A1 | 5/2012 | Xu et al. |
| 2012/0107590 A1 | 5/2012 | Xu et al. |
| 2012/0118583 A1 | 5/2012 | Johnson et al. |
| 2012/0130470 A1 | 5/2012 | Agnew |
| 2012/0145389 A1 | 6/2012 | Fitzpatrick, Jr. |
| 2012/0168152 A1 | 7/2012 | Casciaro |
| 2012/0177905 A1 | 7/2012 | Seals et al. |
| 2012/0205120 A1 | 8/2012 | Howell |
| 2012/0205872 A1 | 8/2012 | Reinhardt et al. |
| 2012/0211239 A1 | 8/2012 | Kritzler et al. |
| 2012/0234546 A1 | 9/2012 | Xu et al. |
| 2012/0234547 A1 | 9/2012 | O'Malley et al. |
| 2012/0269673 A1 | 10/2012 | Koo et al. |
| 2012/0292053 A1 | 11/2012 | Xu |
| 2012/0318513 A1* | 12/2012 | Mazyar et al. ............... 166/304 |
| 2013/0004847 A1 | 1/2013 | Kumar et al. |
| 2013/0008671 A1 | 1/2013 | Booth et al. |
| 2013/0025409 A1 | 1/2013 | Xu |
| 2013/0032357 A1 | 2/2013 | Mazyar et al. |
| 2013/0048304 A1 | 2/2013 | Agrawal |
| 2013/0048305 A1 | 2/2013 | Xu et al. |
| 2013/0052472 A1 | 2/2013 | Xu |
| 2013/0068461 A1 | 3/2013 | Maerz et al. |
| 2013/0081814 A1 | 4/2013 | Gaudette et al. |
| 2013/0084643 A1 | 4/2013 | Commarieu et al. |
| 2013/0105159 A1 | 5/2013 | Alvarez et al. |
| 2013/0126190 A1 | 5/2013 | Mazyar et al. |
| 2013/0133897 A1 | 5/2013 | Baihly et al. |
| 2013/0144290 A1 | 6/2013 | Schiffl et al. |
| 2013/0146144 A1 | 6/2013 | Joseph et al. |
| 2013/0146302 A1 | 6/2013 | Gaudette et al. |
| 2013/0168257 A1 | 7/2013 | Mazyar et al. |
| 2013/0186626 A1 | 7/2013 | Aitken et al. |
| 2013/0240200 A1 | 9/2013 | Frazier |
| 2013/0240203 A1 | 9/2013 | Frazier |
| 2013/0299185 A1 | 11/2013 | Xu et al. |
| 2013/0299192 A1 | 11/2013 | Xu et al. |
| 2013/0300066 A1 | 11/2013 | Xu et al. |
| 2013/0310961 A1 | 11/2013 | Intriago Velez |
| 2013/0319668 A1 | 12/2013 | Tschetter et al. |
| 2013/0327540 A1 | 12/2013 | Hamid et al. |
| 2014/0014339 A1 | 1/2014 | O'Malley et al. |
| 2014/0020712 A1 | 1/2014 | Benson |
| 2014/0027128 A1 | 1/2014 | Johnson et al. |
| 2014/0060834 A1 | 3/2014 | Quintero et al. |

(56) References Cited

U.S. PATENT DOCUMENTS

| | | | |
|---|---|---|---|
| 2014/0116711 | A1 | 5/2014 | Tang et al. |
| 2014/0124216 | A1 | 5/2014 | Fripp et al. |
| 2014/0154341 | A1 | 6/2014 | Manuel et al. |
| 2014/0186207 | A1 | 7/2014 | Bae et al. |
| 2014/0190705 | A1 | 7/2014 | Fripp et al. |
| 2014/0196899 | A1 | 7/2014 | Jordan et al. |
| 2014/0224507 | A1 | 8/2014 | Fripp et al. |
| 2014/0262327 | A1 | 9/2014 | Xu et al. |
| 2014/0284063 | A1 | 9/2014 | Fripp et al. |
| 2014/0332231 | A1 | 11/2014 | Themig et al. |
| 2014/0360728 | A1 | 12/2014 | Tashiro et al. |
| 2015/0060085 | A1 | 3/2015 | Xu |
| 2015/0093589 | A1 | 4/2015 | Mazyar et al. |
| 2015/0240337 | A1 | 8/2015 | Sherman et al. |
| 2015/0299838 | A1 | 10/2015 | Doud et al. |
| 2016/0209391 | A1 | 7/2016 | Zhang et al. |
| 2016/0258242 | A1 | 9/2016 | Hayter et al. |

FOREIGN PATENT DOCUMENTS

| | | | |
|---|---|---|---|
| CN | 101050417 A | | 10/2007 |
| CN | 101457321 A | | 6/2009 |
| EA | 008390 B1 | | 4/2007 |
| EA | 200870227 A1 | | 2/2009 |
| EP | 0033625 A1 | | 8/1981 |
| EP | 1174385 A2 | | 1/2002 |
| EP | 1798301 A1 | | 8/2006 |
| EP | 1857570 A2 | | 11/2007 |
| FR | 2782096 A1 | | 2/2000 |
| GB | 912956 | | 12/1962 |
| GB | 1046330 A | | 10/1966 |
| GB | 1280833 A | | 7/1972 |
| GB | 1357065 A | | 6/1974 |
| JP | 61067770 | | 4/1986 |
| JP | 7054008 A | | 2/1995 |
| JP | 8232029 A | | 9/1996 |
| JP | 2000073152 A | | 3/2000 |
| JP | 2000185725 A1 | | 7/2000 |
| JP | 2002053902 A | | 2/2002 |
| JP | 2004154837 A | | 6/2004 |
| JP | 2004225084 A | | 8/2004 |
| JP | 2004225765 A | | 8/2004 |
| JP | 2005076052 A | | 3/2005 |
| JP | 2009144207 A | | 7/2009 |
| JP | 2010502840 A | | 1/2010 |
| KR | 950014350 B1 | | 11/1995 |
| WO | 9111587 A1 | | 8/1991 |
| WO | 9909227 A1 | | 2/1999 |
| WO | 9947726 | | 9/1999 |
| WO | 03008186 A1 | | 1/2003 |
| WO | 2004001087 A1 | | 12/2003 |
| WO | 2004073889 A1 | | 9/2004 |
| WO | 2007044635 A | | 4/2007 |
| WO | 2007095376 A2 | | 8/2007 |
| WO | 2008017156 A1 | | 2/2008 |
| WO | 2008034042 A3 | | 3/2008 |
| WO | 2008057045 A1 | | 5/2008 |
| WO | 2008079485 A2 | | 7/2008 |
| WO | 2008079777 A2 | | 7/2008 |
| WO | 2008142129 | | 11/2008 |
| WO | 2009079745 A1 | | 7/2009 |
| WO | 2010012184 A1 | | 2/2010 |
| WO | 2010083826 | | 7/2010 |
| WO | 2011071902 A2 | | 6/2011 |
| WO | 2012071449 A2 | | 5/2012 |
| WO | 2012164236 A1 | | 12/2012 |
| WO | 2012175665 A1 | | 12/2012 |
| WO | 2013053057 A1 | | 4/2013 |
| WO | 2013078031 A1 | | 5/2013 |
| WO | 2014121384 A1 | | 8/2014 |
| WO | 2015171585 | | 11/2015 |
| WO | 2016032493 | | 3/2016 |
| WO | 2016085798 | | 6/2016 |

OTHER PUBLICATIONS

Murry, J. L. "Binary Alloy Phase Diagrams" Int. Met. Rev., 30(5) 1985 vol. 1, pp. 103-187.

Shigematsu, I. et al. "Surface treatment of AZ91D magnesium alloy by aluminum diffusion coating" Journal of Materials Science Letters 19 (2000) 473-475.

Song, G. et al. "Understanding Magnesium Corrosion" Advanced Engineering Materials 2003, 5, No. 12. pp. 837-858.

Patent Cooperation Treaty International Search Report and Written Opinion for International Patent Application No. PCT/US2012/034978 filed on Apr. 25, 2012, mailed on Nov. 12, 2012. (9 Pages).

"Declaration of Karl T. Hartwig in Support of Petitioner Pursuant to 37 C.F.R. § 42.120", executed on Nov. 21, 2016 in support of U.S. Pat. No. 8,573,295, 52 pages.

EP Search Report, PCT/US2012049434; Application No. EP 12823958; Date: Jun. 15, 2016; 9 pages.

Notification of Transmittal of the International Search Report and the Written Opinion of the International Searching Authority, or the Declaration; PCT/US2016/015948; Mail Date: May 3, 2016: 10 pages.

Wang, et al. "Laser claddling of eutectic-based Ti—Ni—Al alloy coating on magnesium surface", Surface & Coatings Technology 205 (2010); pp. 189-194.

Yue, et al. "Laser cladding of Ni/Cu/Al functionally graded coating on magnesium substrate", Surface & Coatings Technology 202 (2008); pp. 3043-3049.

Yue, et al. Microstructure and Phase Evolution in Laser Cladding of Ni/Cu/Al Multilayer on Magnesium Substrates; Metallurgical and Materials Transactions A, vol. 41A, Jan. 2010; pp. 212-223.

"Declaration of Karl T. Hartwig in Support of Petitioner Pursuant to 37 C.F.R. § 42.120", executed on Nov. 21, 2016 in support of U.S. Pat. No. 9,101,978, 51 pages.

Callister, Jr., William D., Materials Science and Engineering an Introduction, Seventh Edition, 2006, pp. 111, 627, and G7.

Klar, Erhard, ASM Handbook: International Metals Handbook—Powder Metallurgy, vol. 7, 1997, pp. 14, 276, and 798.

Nie, "Patents of Methods to Prepare Intermetallic Matrix Composites: A Review", Recent Patents on Materials Science 2008, vol. 1, pp. 232-240.

Pardo, et al.; "Corrosion Behaviour of Magnesium/Aluminium Alloys in 3.5 wt% NaCl"; Corrosion Science; 50; pp. 823-834; (2008).

Quik Drill Composite Frac Plug; Baker Hughes, Baker Oil Tools; Copyright 2002; 3 pages.

Reid, Gary Carl, "Literature evaluation of induced groundwater tracers, field tracer techniques, and hydrodynamic dispersion values in porous media", Theisis in Geosciences (Masters), Texas Tech University, Aug. 1981, 109 pages.

Rose, et al.; "The application of the polyaromatic sulfonates as tracers in geothermal reservoirs", Geothermics 30 (2001) pp. 617-640.

Saravanan et al, "Mechanically Alloyed Carbon Nanotubes (CNT) Reinforced Nanocrystalline AA 4032: Synthesis and Characterization", Journal of Minerals and Materials Characterization and Engineering, vol. 9, No. 11 pp. 1027-1035 2010.

Schaffer, J.P. et al., The Science and Design of Engineering Materials, Second Edition, 1999, pp. 122, 123, 698, 699.

Seyni, et al., "On the interest of using degradable fillers in co-ground composite materials", Powder Technology 190, (2009) pp. 176-184.

Shaw, "Benefits and Application of a Surface-Controlled Sliding Sleeve for Fracturing Operations"; Society of Petroleum Engineers, SPE Paper No. 147546; Oct. 30, 2011; 8 pages.

Shi, et al.; "Influence of the Beta Phase on the Corrosion Performance of Anodised Coatings on Magnesium-Aluminium Alloys"; Corrosion Science; 47; pp. 2760-2777; (2005).

Shimizu, et al., "Multi-walled carbon nanotube-reinforced magnesium alloy composites", Scripta Materialia, vol. 58, Issue 4, Feb. 2008, pp. 267-270.

Shumbera, et al. "Improved Water Injector Performance in a Gulf of Mexico Deepwater Development Using an Openhole Frac Pack Completion and Downhole Filter System: Case History." SPE Annual Technical Conference and Exhibition, Oct. 5-8, 2003.

(56) References Cited

OTHER PUBLICATIONS

Singh, et al., "Extended Homogeneity Range of Intermetallic Phases in Mechanically Alloyed Mg—Al Alloys", Elsevier Sciences Ltd., Intemetallics 11, 2003, pp. 373-376.
Song, "Recent Progress in Corrosion and Protection of Magnesium Alloys"; Advanced Engineering Materials; 7(7); pp. 563-586; (2005).
Song, et al.; "A Possible Biodegradable Magnesium Implant Material," Advanced Engineering Materials, vol. 9, Issue 4, Apr. 2007, pp. 298-302.
Song, et al.; "Corrosion Behaviour of AZ21, AZ501 and AZ91 in Sodium Chloride"; Corrosion Science; 40(10); pp. 1769-1791; (1998).
Song, et al.; "Corrosion Mechanisms of Magnesium Alloys"; Advanced Engineering Materials; 1(1); pp. 11-33; (1999).
Song, et al.; "Influence of Microstructure on the Corrosion of Diecast AZ91D"; Corrosion Science; 41; pp. 249-273; (1999).
Spencer et al., "Fluidized Bed Polymer Particle ALD Process for Producing HDPE/Alumina Nanocomposites", The 12th International Conference on Fluidization—New Horizons in Fluidization Engineering, vol. RP4 (2007).
Stanley, et al.; "An Introduction to Ground-Water Tracers", Department of Hydrology and Water Resources, University of Arizona, Mar. 1985, pp. 1-219.
Sun, et al.; "Colloidal Processing of Carbon Nanotube/Alumina Composites" Chem. Mater. 2002, 14, pp. 5169-5172.
Triolo et al., "Resolving the Completion Engineer's Dilemma: Permanent or Retrievable Packer?"; Society of Petroleum Engineers, SPE Paper No. 76711; May 20, 2002; 16 pages.
Tsipas et al. "Effect of High Energy Ball Milling on Titanium-Hydroxyapatite Powders" Powder Metallurgy, Maney Publishing, London, GB, vol. 46, No. 1, Mar. 2003 (Mar. 2003), pp. 73-77.
Vahlas, et al., "Principles and Applications of CVD Powder Technology", Materials Science and Engineering R 53 (2006) pp. 1-72.
Vernon Constien et al., "Development of Reactive Coatings to Protect Sand-Control Screens", SPE 112494, Copyright 2008, Society of Petroleum Engineers, Presented at the 2008 SPE International Symposium and Exhibition on Formation Damage Control.
Vickery, et al.; "New One-Trip Multi-Zone Frac Pack System with Positive Positioning." European Petroleum Conference, Oct. 29-31, 2002, Aberdeen, UK. [Abstract Only].
Walters, et al.; "A Study of Jets from Unsintered-Powder Metal Lined Nonprecision Small-Caliber Shaped Charges", Army Research Laboratory, Aberdeen Proving Ground, MD 21005-5066; Feb. 2001.
Wang, et al., "Contact-Damage-Resistant Ceramic/Single-Wall Carbon Nanotubes and Ceramic/Graphite Composites" Nature Materials, vol. 3, Aug. 2004, pp. 539-544.
Watanabe, et al., "Superplastic Deformation Mechanism in Powder Metallurgy Magnesium Alloys and Composites", Acta mater. 49 (2001) pp. 2027-2037.
Watarai, Trend of research and development for magnesium alloys—reducing the weight of structural materials in motor vehicles, (2006) Science and technology trends, Quaterly review No. 18, 84-97.
Welch et al., "Nonelastomeric Sliding Sleeve Maintains Long Term Integrity in HP/HT Application: Case Histories" [Abstract Only], SPE Eastern Regional Meeting, Oct. 23-25, 1996, Columbus. Ohio.
Xie, Guoqiang et al., "TEM Observation of Interfaces between Particles in Al—Mg Alloy Powder Compacts Prepared by Pulse Electric Current Sintering", Materials Transactions, 2002, pp. 2177-2180, vol. 43—No. 9.
Xu, et al., "Nanostructured Material-Based Completion Tools Enhance Well Productivity"; International Petroleum Technology Conference; Conference Paper IPTC 16538; International Petroleum Technology Conference 2013; 4 pages.
Zemel, "Tracers in the Oil Field", University of Texas at Austin, Center for Petroleum and Geosystems, Jan. 1995, Chapters 1, 2, 3, 7.
Zeng, et al. "Progress and Challenge for Magnesium Alloys as Biomaterials," Advanced Engineering Materials, vol. 10, Issue 8, Aug. 2008, pp. B3-B14.
Zhan, et al., "Single-wall carbon nanotubes as attractive toughening agents in alumina-based nanocomposites" Nature Materials, vol. 2., Jan. 2003, pp. 38-42.
Zhang, et al.; "Formation of metal nanowires on suspended single-walled carbon nanotubes" Applied Physics Letter, vol. 77, No. 19 (2000), pp. 3015-3017.
Zhang, et al.; "High Strength Nanostructured Materials and Their Oil Field Applications"; Society of Petroleum Engineers; Conference Paper SPE 157092; SPE International Oilfield Nanotechnology Conference, 2012; 6 pages.
Zhang, et al.; "Metal Coating on Suspended Carbon Nanotubes and its Implication to Metal—Tube Interaction", Chemical Physics Letters 331 (2000) 35-41.
Zhang, et al.; "Study on the Environmentally Friendly Anodizing of AZ91D Magnesium Alloy"; Surface and Coatings Technology 161; pp. 36-43; (2002).
Zhu et al., "The process of coating on ultrafine particles by surface hydrolysis reaction in a fluidized bed reactor", Surface and Coatings Technology 135 (2000) 14-17.
German, Randall M., Powder Metallurgy Science, Second Edition, 1994, 102 pages.
Petition for Inter Partes Review; Case No. IPR2017-00326; U.S. Pat. No. 9,101,978; Nov. 23, 2016; 46 pages.
Petition for Inter Partes Review; Case No. IPR2017-00327; U.S. Pat. No. 8,573,295; Nov. 23, 2016; 53 pages.
Hsiao, et al., "Anodization of AZ91D Magnesium Alloy in Silicate-Containing Electrolytes"; Surface & Coatings Technology; 199; pp. 127-134; (2005).
Hsiao, et al., "Baking Treatment Effect on Materials Characteristics and Electrochemical Behavior of anodic Film Formed on AZ91D Magnesium Alloy"; Corrosion Science; 49; pp. 781-793; (2007).
Hsiao, et al., "Characterization of Anodic Films Formed on AZ91D Magnesium Alloy"; Surface & Coatings Technology; 190; pp. 299-308; (2005).
Hsiao, et al., "Effect of Heat Treatment on Anodization and Electrochemical Behavior of AZ91D Magnesium Alloy"; J. Mater. Res.; 20(10); pp. 2763-2771;(2005).
Huo et al.; "Corrosion of AZ91D Magnesium Alloy with a Chemical Conversion Coating and Electroless Nickel Layer"; Corrosion Science: 46; pp. 1467-1477; (2004).
International Search Report and Written Opinion, International Application No. PCT/US2016/041849, Date of Mailing Oct. 26, 2016, Korean Intellectual Property Office; International Search Report 5 pages, Written Opinion 7 pages.
International Search Report and Written Opinion; International Application No. PCT/US2010/057763; International Filing Date: Nov. 23, 2010; Date of Mailing: Jul. 28, 2011; 10 pages.
International Search Report and Written Opinion; International Application No. PCT/US2010/059257; International Filing Date: Dec. 7, 2010; Date of Mailing: Jul. 27, 2011; 8 pages.
International Search Report and Written Opinion; International Application No. PCT/US2010/059259; International Filing Date: Dec. 7, 2010; Date of Mailing: Jun. 13, 2011; 8 pages.
International Search Report and Written Opinion; International Application No. PCT/US2010/059263; International Filing Date: Dec. 7, 2010; Date of Mailing: Jul. 8, 2011; 9 pages.
International Search Report and Written Opinion; International Application No. PCT/US2010/059265; International Filing Date: Dec. 7, 2010; Date of Mailing: Jun. 16, 2011; 8 pages.
International Search Report and Written Opinion; International Application No. PCT/US2010/059268; International Filing Date: Dec. 7, 2010; Date of Mailing: Jun. 17, 2011; 8 pages.
International Search Report and Written Opinion; International Application No. PCT/US2011/043036; International Filing Date: Jul. 6, 2011; Date of Mailing: Feb. 23, 2012; 9 pages.
International Search Report and Written Opinion; International Application No. PCT/US2011/047000; International Filing Date: Aug. 9, 2011; Date of Mailing: Dec. 26, 2011; 8 pages.

(56) References Cited

OTHER PUBLICATIONS

International Search Report and Written Opinion; International Application No. PCT/US2011/058099; International Filing Date: Oct. 27, 2011; Date of Mailing: May 11, 2012; 12 pages.
International Search Report and Written Opinion; International Application No. PCT/US2011/058105; International Filing Date: Oct. 27, 2011; Date of Mailing: May 1, 2012; 8 pages.
International Search Report and Written Opinion; International Application No. PCT/US2012/034973; International Filing Date: Apr. 25, 2012; Date of Mailing: Nov. 29, 2012; 8 pages.
International Search Report and Written Opinion; International Application No. PCT/US2012/038622; International Filing Date: May 18, 2012; Date of Mailing: Dec. 6, 2012; 12 pages.
International Search Report and Written Opinion; International Application No. PCT/US2012/044866; International Filing Date: Jun. 29, 2012; Date of Mailing: Jan. 2, 2013; 9 pages.
International Search Report and Written Opinion; International Application No. PCT/US2012/046231; International Filing Date: Jul. 11, 2012; Date of Mailing: Jan. 29, 2013; 9 pages.
International Search Report and Written Opinion; International Application No. PCT/US2012/047163; International Filing Date: Jul. 18, 2012; Date of Mailing Feb. 26, 2013; 12 pages.
International Search Report and Written Opinion; International Application No. PCT/US2012/049434; International Filing Date: Aug. 3, 2012; Date of Mailing: Feb. 1, 2013; 7 pages.
International Search Report and Written Opinion; International Application No. PCT/US2012/052836; International Filing Date: Aug. 29, 2012; Date of Mailing Feb. 1, 2013; 9 pages.
International Search Report and Written Opinion; International Application No. PCT/US2012/053339; International Filing Date: Aug. 31, 2012; Date of Mailing: Feb. 15, 2013; 11 pages.
International Search Report and Written Opinion; International Application No. PCT/US2012/053342; International Filing Date: Aug. 31, 2012; Date of Mailing: Feb. 19, 2013; 9 pages.
International Search Report and Written Opinion; International Application No. PCT/US2012/053350; International Filing Date: Aug. 31, 2012; Date of Mailing: Feb. 25, 2013; 10 pages.
International Search Report and Written Opinion; International Application No. PCT/US2012/071742; International Filing Date: Dec. 27, 2012; Date of Mailing: Apr. 22, 2013; 12 pages.
International Search Report and Written Opinion; International Application No. PCT/US2013/020046; International Filing Date: Jan. 3, 2013; Date of Mailing: Apr. 10, 2013; 7 pages.
International Search Report and Written Opinion; International Application No. PCT/US2013/050475; International Filing Date: Jul. 15, 2013; Date of Mailing: Oct. 10, 2013; 12 pages.
International Search Report and Written Opinion; International Application No. PCT/US2014/010862; International Filing Date: Jan. 9, 2014; Date of Mailing: Apr. 21, 2014; 9 pages.
International Search Report and Written Opinion; International Application No. PCT/US2014/049347; International Filing Date: Aug. 1, 2014; Date of Mailing: Nov. 24, 2014; 11 pages.
International Search Report and Written Opinion; International Application No. PCT/US2014/054720; International Filing Date: Sep. 9, 2014; Date of Mailing: Dec. 17, 2014; 10 pages.
International Search Report and Written Opinion; International Application No. PCT/US2014/058997, International Filing Date: Oct. 3, 2014; Date of Mailing: Jan. 12, 2015; 12 pages.
International Search Report and Written Opinion; International Application No. PCT/US2015/066353; International Filing Date: Dec. 17, 2015; Date of Mailing: Apr. 1, 2016; 14 pages.
International Search Report for related PCT Application No. PCT/US2013/035258, dated Jul. 4, 2013, pp. 1-4.
International Search Report for related PCT Application No. PCT/US2013/035261, dated Jul. 10, 2013, pp. 1-4.
International Search Report for related PCT Application No. PCT/US2013/035262, dated Jul. 1, 2013, pp. 1-4.
International Search Report for related PCT Application No. PCT/US2013/068062, dated Feb. 12, 2014, pp. 1-3.

Kuzumaki, et al.; "Mechanical Characteristics and Preparation of Carbon Nanotube Fiber-Reinforced Ti Composite", Advanced Engineering Materials, 2000, 2, No. 7.
Lavernia et al., "Cryomilled Nanostructured Materials: Processing and Properties", Materials Science and Engineering A, 493, (2008) pp. 207-214.
Lee, et al., "Effects of Ni addition on hydrogen storage properties of Mg17AL12 alloy", Materials Chemistry and Physics, 2011, 126, pp. 319-324.
Li, "Design of Abrasive Water Jet Perforation and Hydraulic Fracturing Tool," Oil Field Equipment, Mar. 2011.
Li, et al., "Investigation of aluminium-based nancompsoites with ultra-high strength", Materials Science and Engineering A, 527, pp. 305-316, (2009).
Lin et al., "Processing and Microstructure of Nano-Mo/Al2O3 Composites from MOCVD and Fluidized Bed", Nanostructured Materials, Nov. 1999, vol. 11, No. 8, pp. 1361-1377.
Liu, et al., "Calculated Phase Diagrams and the Corrosion of Die-Cast Mg—Al Alloys", Corrosion Science, 2009, 51, 606-619.
Liu, et al.; "Electroless Nickel Plating on AZ91 Mg Alloy Substrate"; Surface & Coatings Technology; 200; pp. 5087-5093; (2006).
Lunder, et al.; "The Role of Mg17Al12 Phase in the Corrosion of Mg Alloy AZ91"; Corrosion; 45(9); pp. 741-748; (1989).
Maisano, "Cryomilling of Aluminum-Based and Magnesium-Based Metal Powders", Thesis, Virginia Tech, Jan. 13, 2006.
Majumdar, et al., "Laser Surface Engineering of a Magnesium Alloy with Al + Al2O3", Surface and Coatings Technology 179 (2004) pp. 297-305.
Mathis, "Sand Management: A Review of Approaches and Concerns", Society of Petroleum Engineers, SPE Paper No. 82240, SPE European Formation Damage Conference, The Hague, The Netherlands, May 13-14, 2003.
"Baker Hughes Refines Expandable Tubular Technology with Abaqus and Isight", Simulia Realistic Simulation News, Jan./Feb. 2011, pp. 12-13.
"Optisleeve Sliding Sleeve", [online]; [retrieved on Jun. 25, 2010]; retrieved from the Internet weatherford.com/weatherford/groups/.../weatherfordcorp/WFT033159.pdf.
"Reactivity series", Wikipedia, http://en.wikipedia.org/w/index.php?title=Reactivity_series&printable=yes downloaded on May 18, 2014. 8 pages.
"Sliding Sleeve", Omega Completion Technology Ltd, Sep. 29, 2009, retrieved on: www.omega-completion.com.
Adams, et al.; "Thermal stabilities of aromatic acids as geothermal tracers", Geothermics, vol. 21, No. 3, 1992, pp. 323-339.
Ambat, et al., "Electroless Nickel-Plating on AZ91D Magnesium Alloy: Effect of Substrate Microstructure and Plating Parameters"; Surface and Coatings Technology; 179; pp. 124-134; (2004).
Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; Mar. 24-25, 2015; 10 Pages.
Ayman, et al.; "Effect of Consolidation and Extrusion Temperatures on Tensile Properties of Hot Extruded ZK61 Magnesium Alloy Gas Atomized Powders via Spark Plasma Sintering", Transactions of JWRI, vol. 38 (2009), No. 2, pp. 1-5.
Baker Hughes Incorporated. IN-Tallic Disintegrating Frac Balls. Houston: Baker Hughes Incorporated, 2011. Accessed Mar. 6, 2015.
Baker Hughes, "Flow Control Systems," [online]; [retrieved on May 20, 2010]; retrieved from the Internet http://www.bakerhughes.com/products-and-services/completions-and-productions/well-completions/packers-and-flow-control/flow-control-systems.
Baker Hughes, "Multistage", Oct. 31, 2011, BakerHughes.com; accessed Mar. 6, 2015.
Baker Oil Tools, "Baker Oil Tools Introduces Revolutionary Sand Control Completion Technology," May 2, 2005.
Baker Oil Tools, "Z-Seal Metal-to-Metal Expandable Sealing Device Uses Expanding Metal in Place of Elastomers," Nov. 6, 2006.
Bakshi et al., "Carbon nanotube reinforced metal matrix composites—a review," International Materials Reviews; 2010, pp. 41-64, vol. 55, No. 1.

(56) References Cited

OTHER PUBLICATIONS

Bastow, et al., "Clustering and formation of nano-precipitates in dilute aluminum and magnesium alloys", Materials Science and Engineering, 2003, C23, 757-762.

Bercegeay, et al., "A One-Trip Gravel Packing System"; Society of Petroleum Engineers, Offshort Technology Conference, SPE Paper No. 4771; Feb. 7-8, 1974.

Bin et al., "Advances in Fluidization CVD Technology", East China University of Chemical Technology, China Academic Journal Electronic Publishing House, vol. 13, No. 4, Nov. 1992, pp. 360-365, English Abstract on p. 366.

Birbilis, et al., "Exploring Corrosion Protection of Mg Via Ionic Liquid Pretreatment", Surface & Coatings Technology; 201, pp. 4496-4504, (2007).

Bououdina, et al., "Comparative Study of Mechanical Alloying of (Mg+Al) and (Mg+Al+Ni) Mixtures for Hydrogen Storage", J. Alloys, Compds, 2002, 336, 222-231.

Bybee, "One-Trip Completion System Eliminates Perforations," Completions Today, Sep. 2007, pp. 52-53.

Carrejo, et al., "Improving Flow Assurance in Multi-Zone Fracturing Treatments in Hydrocarbon Reservoirs with High Strength Corrodible Tripping Balls"; Society of Petroleum Engineers; SPE Paper No. 151613; Apr. 16, 2012; 6 pages.

Chang, et al., "Electrodeposition of Aluminum on Magnesium Alloy in Aluminum Chloride (AlCl3)-1-ethyl-3-methylimidazolium chloride (EMIC) Ionic Liquid and Its Corrosion Behavior"; Electrochemistry Communications; 9; pp. 1602-1606; (2007).

Christoglou, et al., "Deposition of Aluminum on Magnesium by a CVD Process", Surface and Coatings Technology 184 (2004) 149-155.

Chuan-Jun et al., "Study on Corrosion Kinetics of Mg—Ni alloys", Journal of Kunming University of Science and Technology, vol. 34, No. 5, pp. 10-13, Oct. 2009.

Constantine, "Selective Production of Horizontal Openhole Completions Using ECP and Sliding Sleeve Technology." SPE Rocky Mountain Regional Meeting, May 15-18, 1999, Gillette, Wyoming. [Abstract Only].

Coronado, "Development of an Internal Coiled Tubing Connector Utilizing Permanent Packer Technology"; Society of Petroleum Engineers, SPE Paper No. 46036; Apr. 15, 1998; 10 pages.

Curtin, et al., "CNT-reinforced ceramics and metals," Materials Today, 2004, vol. 7, pp. 44-49.

European Search Report for EP Application No. 10836533.9 dated Jul. 27, 2015; 7 pages.

European Search Report for EP Application No. 10836538.8 dated Jul. 27, 2015; 7 pages.

European Search Report for EP Application No. 10836539.6 dated Jul. 27, 2015; 7 pages.

European Search Report for EP Application No. 10836540.4 dated Aug. 20, 2015; 7 pages.

European Search Report for EP Application No. 12827733.2 dated Jan. 21, 2015; 6 pages.

European Search Report for EP Application No. 12827915.5 dated Dec. 23, 2015; 8 pages.

European Search Report for EP Application No. 12828903.0 dated Dec. 23, 2015.

European Search Report for European Application No. 12820355.1-1353, dated Dec. 18, 2015, 9 pages.

Extended European Search Report for EP Application No. 10836539.6-1353, dated Jul. 27, 2015, 7 pages.

Extended European Search Report for EP Application No. 12828379.3-1373, dated May 20, 2016, 8 pages.

Extended European Search Report; EP Application No. 12822169.4-1605/2739812; Mailing Date: Nov. 17, 2015; 9 pages.

Feng, et al., "Electroless Plating of Carbon Nanotubes with Silver" Journal of Materials Science, 39, (2004) pp. 3241-3243.

Flahaut, et al., "Carbon Nanotube-Metal-Oxide Nanocomposites: Microstructure, Electrical Conductivity and Mechanical Properties" Acta amter. 48 (2000), pp. 3803-3812.

Forsyth, et al.; "An Ionic Liquid Surface Treatment for Corrosion Protection of Magnesium Alloy AZ31"; Electrochem. Solid-State Lett. 2006 vol. 9, Issue 11, B52-B55/ 9(11); Abstract only; 1 page.

Galanty, et al. "Consolidation of metal powders during the extrusion process," Journal of Materials Processing Technology (2002), pp. 491-496.

Garfield, "Formation Damage Control Utilizing Composite-Bridge-Plug Technology for Monobore, Multizone Stimulation Operations," SPE 70004, 2001, Society of Petroleum Engineers Inc., This paper was prepared for presentation at the SPE Per.

Garfield, New One-Trip Sand-Control Completion System that Eliminates Formation Damage Resulting From conventional Perforating and Gravel-Packing Operations:, SPE Annual Technical Conference and Exhibition, Oct. 9-12, 2005.

Garfield, et al., "Maximizing Inflow Performance in Soft Sand Completions Using New One-trip Sand Control Liner Completion Technology", SPE European Formation Damage Conference, May 25-27, 2005.

Goh, et al., "Development of novel carbon nanotube reinforced magnesium nanocomposites using the powder metallurgy technique", Nanottechnology 17 (2006) 7-12.

Gray, et al., "Protective Coatings on Magnesium and Its Alloys—a Critical Review", Journal of Alloys and Compounds 336 (2002), pp. 88-113.

Han, et al., "Mechanical Properties of Nanostructured Materials", Rev. Adv. Mater. Sci. 9(2005) 1-16.

Hermawan, et al., "Iron-manganese: new class of metallic degradable biomaterials prepared by powder metallurgy", Powder Metallurgy, vol. 51, No. 1, (2008), pp. 38-45.

Hjortstam, et al. "Can we achieve ultra-low resistivity in carbon nanotube-based metal composites," Applied Physics A (2004), vol. 78, Issue 8, pp. 1175-1179.

\* cited by examiner

INTERMETALLIC METALLIC COMPOSITE, METHOD OF MANUFACTURE THEREOF AND ARTICLES COMPRISING THE SAME

BACKGROUND

1. Field of the Invention

This disclosure relates to intermetallic metallic composites, methods of manufacture thereof and articles comprising the same.

2. Description of the Related Art

In performing underground operations such as, for example oil and natural gas exploration, carbon dioxide sequestration, exploration and mining for minerals such as iron, uranium, and the like, exploration for water, and the like, it is often desirable to first drill a borehole that penetrates into the formation.

Once a borehole has been drilled, it is desirable for the borehole to be completed before minerals, hydrocarbons, and the like can be extracted from it. A completion involves the design, selection, and installation of equipment and materials in or around the borehole for conveying, pumping, or controlling the production or injection of fluids into the borehole. After the borehole has been completed, the extraction of minerals, oil and gas, or water can begin.

Sealing systems, such as packers, are commonly deployed in a borehole as completion equipment. Packers are often used to isolate portions of a borehole from one another. For example, packers are used to seal the annulus between a tubing string and a wall (in the case of uncased or open hole) or casing (in the case of cased hole) of the borehole, isolating the portion of the borehole uphole of the packer from the portion of the borehole downhole of the packer.

Sealing systems that isolate one portion of the borehole from another portion of the borehole generally employ an expandable component and a support member. The support member protects the expandable component until the expandable component is expanded in the borehole to effect the isolation. In order to expand the expandable component, it is desirable to first remove the support member. Removing the support member at the wrong rate can result in improper isolation of one part of the borehole from another. It is therefore desirable to use a support member that can be removed in a controlled fashion when desired.

SUMMARY

Disclosed herein is an article comprising a plurality of domains fused together; wherein the domains comprise a core comprising a first metal; and a first layer disposed upon the core; the first layer comprising a second metal; the first metal being chemically different the second metal; the article being used as a supporting element in a sealable system for oil exploration.

Disclosed herein too is an article comprising a plurality of domains fused together; wherein the domains comprise an intermetallic fine grained alloy that comprises a first metal and a second metal; wherein the domains comprise a gradient in composition between the first metal and the second metal; and wherein the first metal is chemically different the second metal.

Disclosed herein too is a method comprising rolling a sheet in a roll mill; the sheet comprising a first metal and having disposed upon each opposing face of the sheet a first layer that comprises a second metal; the second metal being chemically different from the first metal; cutting the sheet into a plurality of sheets; stacking the plurality of sheets; and rolling the stacked sheets in the roll mill to form a blank.

Disclosed herein too is a method comprising disposing upon a tube string, a sealing system; the sealing system comprising a expandable component and a support member; wherein the support member comprises a plurality of domains fused together; wherein the domains comprise a core comprising a first metal; and a first layer disposed upon the core; the first layer comprising a second metal; the first metal being chemically different the second metal; introducing the tube string into a well; and dissolving the support member.

BRIEF DESCRIPTION OF THE FIGURES

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 1:
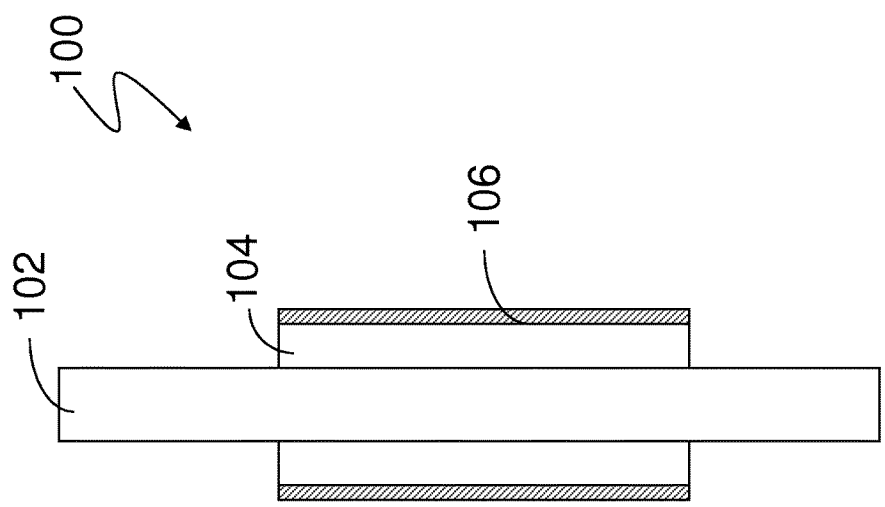
FIG. 1 is a depiction of an exemplary prior art sealing system.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, domains, layers and/or sections, these elements, components, regions, domains, layers and/or sections should not be limited by these terms. These terms are only used to distinguish one element, component, region, domain, layer or section from another element, component, region, domain, layer or section. Thus, "a first element," "component," "region," "domain," "layer" or "section" discussed below could be termed a second element, component, region, domain, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross sectional illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" is inclusive of the transition terms "consisting of" and "consisting essentially of".

All "inclusive" numerical ranges included herein are interchangeable and are inclusive of end points and all numerical values that lie between the endpoints.

As used herein a "borehole" may be any type of borehole in an earth formation such as a well, including, but not limited to, a producing well, a non-producing well, an experimental well, an exploratory well, a well for storage or sequestration, and the like.

Boreholes may be vertical, horizontal, some angle between vertical and horizontal, diverted or non-diverted, and combinations thereof, for example a vertical borehole with a non-vertical component.

The term "support member" refers to a device that supports the expandable component and the tubing string. The "support member" may also function to protect, guard and/or shield the expandable component from damage prior to its removal.

The term "expandable" as used in the "expandable component", can encompass a variety of means by which the expansion can occur. The expansion can occur for example, through swelling, inflation via pressure, thermal expansion, and the like, or a combination thereof. Some expandable components may be actuated by hydraulic pressure transmitted either through the tubing bore, annulus, or a control line. Other expandable components may be actuated via an electric line deployed from the surface of the borehole. Furthermore, some expandable components have been used that employ materials that respond to the surrounding borehole fluids and borehole to form a seal.

Disclosed herein is an article for a sealing system that comprises a plurality of multilayered metallic domains that may comprise particles. In an exemplary embodiment, the article is a support member for a sealing system that is used in underground boreholes. Each domain comprises a metallic core that comprises a first metal. Disposed upon the metallic core is a first layer that comprises a second metal. The first layer may have disposed thereon an optional second layer that comprises a third metal. These multilayered metallic domains each function as a galvanic cell when exposed to borehole fluids. In one embodiment, these multilayered metallic domains are manufactured into a support member for a sealing system that can be dissolved in a controlled manner (when exposed to borehole fluids) to expose an expandable component to the surrounding borehole fluids. The surrounding borehole fluids cause it to swell to form a seal that isolates one portion of the borehole from another portion of the borehole.

Disclosed herein too is a method of manufacturing a support member that comprises the plurality of fused multilayered metallic domains that may comprise sheets or lamina. The method comprises manufacturing a sheet from the first metal and disposing upon the opposing surfaces of the sheet a layer of a second metal. An optional third layer of metal may then be disposed upon the opposing surfaces of the sheet. The sheet is then cut into several smaller sheets, which are stacked on one another to form a stack. The stack is subjected to roll milling until it is reduced to a thickness that is a fraction of the original thickness of the stacked sheets. The first multilayered sheet is once again cut into several sheets, which are stacked one on another and subjected to rolling to produce a second multilayered sheet. The process of forming sheets, cutting and stacking them, and then rolling them is repeated several times to produce a final sheet. The final sheet is then cut, stacked as before and forged into a desired shape (hereinafter termed the "article").

FIG. 1 is a depiction of an exemplary sealing system 100. The sealing system 100 is disposed around a tubing string 102 and comprises an expandable component 104 and a support member 106. The support member 106 supports the expandable component 104 during the introduction of the tubing string 102 into the reservoir and prevents the expandable component 104 from degrading prior to the point at which it has to be utilized.

When the tubing string 102 has reached the point in the well at which it is to be used, the support member 106 is removed from the sealing system 100 and the expandable component 104 is subjected to expansion to isolate one portion of the wellbore from another portion of the wellbore.

In order to effect the desired use of the expandable component 104, the removal of the support member 106 has to be accomplished under controlled conditions. It is therefore desirable to have a support member 106 manufactured from a material that can be removed in a controlled fashion so that the swelling of the expandable component 104 can be brought about at the desired time to isolate one portion of the wellbore from another.

In an exemplary embodiment, the support member 106 is manufactured by stacking several multilayered metal sheets and repeatedly passing these sheets through a roll mill. In each "pass" through the roll mill, the thickness of the stack is reduced to about 15 to about 30% of the original thickness of the stack. A "pass" as defined herein is the process by which the original stack is reduced in thickness to about 15 to about 30% of the original thickness of the stack. A pass may involve multiple trips between the roll mills. In one embodiment, the thickness of the stack is reduced to about 20 to about 28% of the original thickness of the stack. In another embodiment, the thickness of the stack is reduced to about 22 to about 26% of the original thickness of the stack.

It is generally desirable to conduct a number of passes in the roll mill so as to reduce the thickness of the original sheet to about $1/8$ to about $1/15$ of its original thickness, specifically about $1/10$ to about $1/13$ of its original thickness. The number of passes conducted during the roll milling is about 2 to about 15, specifically about 3 to about 14 and more specifically about 5 to about 10.

The rolling process may be a cold rolling process or a hot rolling process. Cold rolling processes are generally conducted below the recrystallization temperature of the metal, while hot rolling processes are generally conducted at a temperature above the recrystallization temperature of the metal. The recrystallization temperature in consideration would be that for the metal or alloy having the highest recrystallization temperature of all of the metals in the article. In an exemplary embodiment, the rolling process is a hot rolling process. The rolling process is generally conducted at a temperature of about 150 to about 450° C. In an exemplary embodiment, the rolling process is generally conducted at a temperature of about 400 to about 437° C.

The process of forming multilayered sheets that are repeatedly rolled, cut and stacked produces a structure that comprises fine grained structure, including intermingled domains of a first and a second metal and their combinations. The structure of the domains in the article is similar to that which would be obtained from the sintering of individual particles each of which comprise a core and a plurality of layers disposed upon this core to begin with. In other words, the product comprises multistructured domains that contact one another. The multilayered domains in the article contact one another and have interstices located between these domains. In one embodiment, these domains are fused to one another. The domains may have gradients in composition between the first metal and the second metal. It may also have gradients in composition between the second metal and the third metal as well as between the first metal and the third metal.

In one embodiment, the domains may alternatively also comprise a fine-grained alloy rich in small intermetallic compound domains between the first metal and the second metal, the first metal and the third metal and the second metal and the third metal, with no layers between these respective metals. The presence of a fine grained alloy results in a number of advantages. Fine grained alloys with concentration gradients produce effective galvanic cells. These structures produce an improvement in strength due to fine grain sizes and dense intergranular regions over other structures that contain layered domains.

Figure 2:
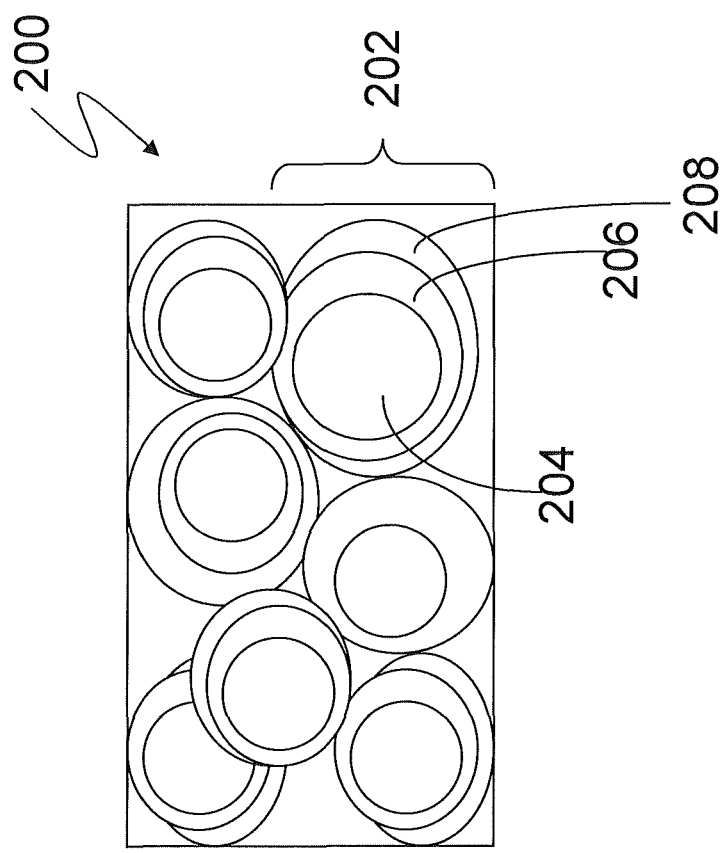
FIG. 2 is a depiction of an exemplary microstructure that is present in the article.

FIG. 2 is a depiction of an exemplary microstructure for articles manufactured by the method described herein. The FIG. 2 depicts the microstructure of an exemplary article 200 comprising the domains 202 described herein. As may be seen in FIG. 2, each domain comprises the core 204 that comprises the first metal, the first layer 206 that comprises the second metal, and the optional third layer 208 that comprises the third metal. As noted above, some domains may comprise a fine grained alloy that comprises an intermetallic compound.

The core may have an average domain size of about 44 to about 1400 micrometers. In an exemplary embodiment, the core may have an average domain size of about 63 to about 105 micrometers. The average domain size is a radius of gyration.

The core with the first layer disposed thereon may have an average domain size of about 45.1 to about 1445 micrometers. In an exemplary embodiment, the core with the first layer disposed thereon may have an average domain size of about 64.6 to about 108 micrometers.

The core with the first and the second layer disposed thereon may have an average domain size of about 45 to about 1600 micrometers. In an exemplary embodiment, the core with the first and the second layer disposed thereon may have an average domain size of about 65 to about 110 micrometers.

In one embodiment, in one method of manufacturing the support member, a sheet comprising a first metal is coated on its opposing faces with a layer of a second metal. The sheet may have an original thickness of about 0.05 to about 0.20 centimeters, specifically about 0.08 to about 0.18 centimeters, and more specifically about 0.1 to about 0.15 centimeters. Each layer of second metal may have a thickness of about 0.005 centimeters to about 0.02 centimeters, specifically about 0.003 to about 0.015 centimeters, and more specifically about 0.001 centimeters to about 0.013 centimeters. An optional third metal layer may be disposed on the opposing faces of the sheet to contact the second metal layer. The thickness of each third metal layer can be the same as the thickness of each second metal layer.

The first metal is generally present in an amount of about 60 to about 95 weight percent (wt %) based on the total weight of the article. An exemplary amount of the first metal is about 90 to about 92 wt % based on the total weight of the article.

The second metal is generally present in an amount of about 5 to about 40 wt %, based on the total weight of the article. An exemplary amount of the second metal is about 8 to about 10 wt % based on the total weight of the article.

The third metal is generally present in an amount of about 0.0001 to about 3 weight percent (wt %) based on the total weight of the article. An exemplary amount of the third metal is about 0.01 to about 0.1 wt % based on the total weight of the article.

In one embodiment, the layer of second metal may be disposed upon the sheet by techniques involving vapor deposition. Examples of suitable techniques for disposing the second layer include chemical or physical vapor deposition.

Chemical vapor deposition includes atmospheric chemical vapor deposition, low pressure chemical vapor deposition, ultrahigh vacuum chemical vapor deposition, aerosol assisted vapor deposition, direct liquid injection chemical vapor deposition, microwave plasma assisted chemical vapor deposition, plasma enhanced chemical vapor deposition, atomic layer chemical vapor deposition, hot wire (hot filament) chemical vapor deposition, metal organic chemical vapor deposition, combustion chemical vapor deposition, vapor phase epitaxy, rapid thermal chemical vapor deposition, hybrid physical chemical vapor deposition, or a combination comprising at least one of the foregoing processes. If combinations of the foregoing chemical vapor deposition processes are used, they may be employed simultaneously or sequentially.

Physical vapor deposition includes cathodic arc deposition, electron beam physical vapor deposition, evaporative deposition, pulsed laser deposition, sputter deposition or a combination comprising at least one of the foregoing processes. If combinations of the foregoing physical vapor deposition processes are used, they may be employed simultaneously or sequentially. Combinations of physical vapor deposition processes and chemical vapor deposition processes may also be used.

In another embodiment, the layer of second metal may be disposed upon the sheet by techniques involving electroless plating, electroplating, dip-coating or cold spraying. Combinations of such methods can also be used to apply the second layer to the sheet.

The first metal and the second metal are selected such that they are capable of forming a galvanic cell that can undergo corrosion in the presence of borehole fluids. In other words, if the first metal forms the anode of the galvanic cell, the second metal forms the cathode and vice versa. The first metal is different in composition from the second metal. The third metal is generally selected to control the rate of corrosion of the galvanic cell.

The first metal and the second metal may comprise transition metals, alkali metals, alkaline earth metals, or combinations thereof so long as the first metal is not the same as the second metal. The first metal may comprise aluminum, magnesium zinc, copper, iron, nickel, cobalt, or the like, or a combination comprising at least one of the foregoing metals. The second metal may comprise aluminum, magnesium zinc, copper, iron, nickel, cobalt, or the like, or a combination comprising at least one of the foregoing metals so long as it is chemically different from the first metal. In one embodiment, the second metal is electrolytically different from the first metal The third metal may comprise nickel, aluminum, magnesium zinc, copper, iron, cobalt, or the like, or a combination comprising at least one of the foregoing metals so long as it is chemically different from the first metal. In one embodiment, the third metal is chemically different from the first metal and from the second metal. In another embodiment, the third metal is electrolytically different from the first metal and from the second metal.

In one exemplary embodiment, the first metal comprises aluminum, while the second metal comprises magnesium. The third metal may comprise nickel.

In another exemplary embodiment, the first metal comprises magnesium, while the second metal comprises aluminum. The third metal may comprise nickel.

In one embodiment, the sheet obtained after being subjected to a reduction in thickness may be stacked and forged in a roll mill into a blank. The blank may then be extruded into a desired shape to form the desired article. In an exemplary embodiment, the sheet obtained after being subjected to a 2 to 5-pass reduction in thickness may be stacked and forged in a roll mill into a blank. The blank is then be extruded into a final desired shape.

In another embodiment, the sheet obtained after being subjected to a reduction in thickness may be stacked and forged in a roll mill or in a press into round stock.

The process is advantageous in that it can be conducted rapidly when compared with a comparative sintering process involving powders. It also is desirable because it does not involve the formation and pressing of metal powders, which can sometimes be difficult. The process described herein can be advantageously used for manufacturing sheet stock for rolled tube, stamped flat items, billet materials for balls, and the like.

Support members manufactured by this method are advantageous because their dissolution by borehole fluids can be controlled. This permits the swelling of the expandable component to be controlled as well.

The article described herein can be used as a support member for a sealing system for underground wells from which oil and natural gas are extracted. In one method of using the support member, it is disposed upon an expandable component in a sealing system to support the expandable component until it is desired to have the expandable component expand and form a seal. When the tube string with the sealing system is moved underground during oil exploration, the borehole fluids interact with the support member setting up plurality of galvanic cells within the support member. The galvanic cells become operative causing the eventual corrosion of the support member and the exposure of the expandable component to the borehole fluids. The expandable component expands to causing sealing of one portion of the borehole from another portion of the well.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An article comprising:
    a plurality of domains fused together; wherein the domains comprise:
        a core comprising a first metal; and
        a first layer disposed upon the core; the first layer comprising a second metal; the first metal being chemically different the second metal; wherein the domains comprise a gradient in composition between the first metal and the second metal; wherein the core is in the form of a particle having a domain size of 44 to 1400 micrometers, and wherein the plurality of domains have interstices between them;
    a second layer that is disposed upon the first layer, wherein the second layer comprises a third metal that is different from the first metal and the second metal; where the third metal is nickel, aluminum, magnesium zinc, copper, iron, cobalt, or a combination thereof; where the third metal is present in an amount of 0.01 to 0.1 wt %, based on a total weight of the article; where the second metal is present in an amount of 8 to 10 wt %, based on the total weight of the article.

2. The article of claim 1, wherein the article is a supporting element in a sealable system for oil exploration.

3. The article of claim 1, wherein the article is an actuating ball for a borehole system.

4. The article of claim 1, wherein the first metal is aluminum, magnesium, zinc, copper, iron, nickel, cobalt, or a combination comprising at least one of the foregoing metals.

5. The article of claim 1, wherein the first metal is aluminum.

6. The article of claim 1, wherein the first metal is magnesium.

7. The article of claim 1, wherein the second metal is aluminum, magnesium, zinc, copper, iron, nickel, cobalt, or a combination comprising at least one of the foregoing metals.

8. The article of claim 1, wherein the second metal is aluminum.

9. The article of claim 1, wherein the second metal is magnesium.

10. The article of claim 1, wherein the article is manufactured by rolling a sheet comprising the first metal and coated on each of its opposing faces with a first layer comprising the second metal, cutting the rolled sheet into a plurality of sheets; stacking the plurality of sheets; re-rolling the stacked sheets in the roll mill; and repeatedly cutting, stacking and rolling the stacked sheets.

11. An article comprising:
a plurality of domains fused together; wherein the domains comprise:
an intermetallic fine grained alloy that comprises a first metal, a second metal and a third metal; wherein the domains comprise a gradient in composition between the first metal and the second metal; and wherein the first metal is chemically different the second metal; wherein a core of the domain comprises the first metal and is in the form of a particle having a domain size of 44 to 1400 micrometers, and wherein the plurality of domains have interstices between them; where the third metal is different from the first metal and the second metal; where the third metal is nickel, aluminum, magnesium zinc, copper, iron, cobalt, or a combination thereof; where the third metal is present in an amount of 0.01 to 0.1 wt %, based on a total weight of the article; where the second metal is present in an amount of 8 to 10 wt %, based on the total weight of the article.

12. The article of claim 11, wherein the article is a supporting element in a sealable system for oil exploration.

13. The article of claim 11, wherein the article is an actuating ball for a borehole system.

14. The article of claim 11, wherein the first metal is aluminum.

15. The article of claim 11, wherein the first metal is magnesium.

16. The article of claim 11, wherein the second metal is aluminum.

17. The article of claim 11, wherein the second metal is magnesium.

* * * * *